United States Patent [19]

Buckholz, Jr. et al.

[11] Patent Number: 4,514,431
[45] Date of Patent: Apr. 30, 1985

[54] ENHANCING THE TASTE OF A MEAT-FLAVORED FOODSTUFF

[75] Inventors: Lawrence Buckholz, Jr., Jackson; Richard A. Wilson, Westfield; Roger Kleinberg, Jackson, all of N.J.

[73] Assignee: International Flavors & Fragrances Inc., New York, N.Y.

[21] Appl. No.: 604,266

[22] Filed: Apr. 26, 1984

Related U.S. Application Data

[60] Division of Ser. No. 507,289, Jun. 23, 1983, Pat. No. 4,471,002, which is a continuation-in-part of Ser. No. 445,766, Nov. 30, 1982, abandoned.

[51] Int. Cl.$^3$ .............................................. A23L 1/22
[52] U.S. Cl. .................... 426/641; 426/582; 426/650; 426/649; 426/533; 426/537
[58] Field of Search ............... 426/533, 537, 649, 650, 426/641

[56] References Cited

U.S. PATENT DOCUMENTS

| | | | |
|---|---|---|---|
| 1,874,055 | 8/1932 | Liebre et al. | 426/650 X |
| 3,524,747 | 8/1970 | O'Hara et al. | 426/537 |
| 3,645,753 | 2/1972 | Gasser | 426/650 |
| 3,904,655 | 9/1975 | van den Ouweland | 426/533 X |
| 4,066,793 | 1/1978 | Eguchi | 426/533 X |
| 4,243,691 | 1/1981 | Mohlenkamp et al. | 426/537 X |
| 4,376,132 | 3/1983 | Eguchi et al. | 426/537 |

OTHER PUBLICATIONS

Winter, A., Consumer's Dictionary of Food Additives, 1972, Crown Publ., New York, pp. 136–137.
Furia, CRC Handbook of Food Additives, vol. I, 1972, CRC: Cleveland, pp. 660–663.

*Primary Examiner*—Joseph Golian
*Attorney, Agent, or Firm*—Arthur L. Liberman

[57] ABSTRACT

Described is the use in augmenting or enhancing the flavor of a meat-flavored foodstuff by using a mixed seasoning composition capable of being solubilized in water and forming a single aqueous phase comprising:
(a) from about 0.25 up to about 0.80 mole percent of lactic acid and/or a lactate salt;
(b) from 0 up to about 0.09 percent on a dry basis of glycolic acid or a glycolate salt;
(c) from 0 up to about 10.0 mole percent on a dry basis of a magnesium salt;
(d) from about 6 mole percent up to about 50 mole percent on a dry basis of a phosphate and/or a monoacid phosphate and/or a diacid phosphate and/or phosphoric acid taken alone or taken further together with at least one tripolyphosphate; pyrophosphate or polymetaphosphate;
(e) from 0 mole percent up to about 40 mole percent on a dry basis of a sodium salt;
(f) from about 8 mole percent up to about 50 mole percent on a dry basis of a potassium salt;
(g) from about 0.3 mole percent up to about 16 mole percent on a dry basis of a chloride;
(h) from 0 mole percent up to about 30 mole percent on a dry basis of a carbonate and/or a bicarbonate and/or carbonic acid;
(j) from 0 mole percent up to about 2.0 mole percent on a dry basis of a monobasic glutamate and/or a dibasic glutamate and/or glutamic acid; and
(k) from 0 up to about 0.6 mole percent on a dry basis of a calcium salt with the first proviso that the sum total of mole percent on a dry basis of sodium ion, potassium ion, magnesium ion and calcium ion is from about 48 mole percent up to about 60 mole percent; and with the second proviso that the sum total mole percent on a dry basis of carbonate/bicarbonate/carbonic acid ion species mixture having the formula:

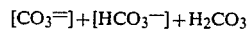

$[CO_3^=] + [HCO_3^-] + H_2CO_3$ taken together with the sum total mole percent on a dry basis of the phosphate/monobasic phosphate/dibasic phosphate species mixture having the formula:

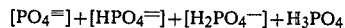

$[PO_4^\equiv] + [HPO_4^=] + [H_2PO_4^-] + H_3PO_4$ taken alone or taken further together with at least one of the species tripolyphosphate, pyrophosphate and/or polymetaphosphate is from about 34 mole percent up to about 50 mole percent.

10 Claims, 8 Drawing Figures

ENHANCING THE TASTE OF A MEAT-FLAVORED FOODSTUFF

This application is a divisional of application for U.S. Ser. No. 507,289 filed on June 23, 1983 now U.S. Pat. No. 4,471,002 which is a continuation-in-part application for U.S. Ser. No. 445,766 filed on Nov. 30, 1982, now abandoned.

BACKGROUND OF THE INVENTION

I. Field of the Invention

The present invention relates to a mixed or combination seasoning as a flavoring agent to be used alone or in combination with other flavorings. More particularly, the present invention is concerned with a mixed seasoning, the use of which gives rise to the augmenting or enhancing of the aroma or taste of foodstuffs including dairy flavored foodstuffs, animal foodstuffs and savory flavored foodstuffs. More particularly, the foodstuffs and animal foods the aroma and tastes of which are augmented or enhanced are:

(A) Dairy
   (i) processed cheese;
   (ii) cheese spreads;
   (iii) cheese dips;
   (iv) cheese analogues;
   (v) an imitation cheese analogues
(B) Animal Foods
   (i) dog food;
   (ii) cat food;
(C) Savory
   (i) extruded snacks;
   (ii) crackers, pretzels, potato chips and the like;
   (iii) meat sauces, white sauces and gravies;
   (iv) casseroles;
   (v) cheese sauces;
   (vi) soups (instant and finished);
   (vii) prepared meats and meat spreads;
   (viii) meat and poultry analogues extenders and the like;
   (ix) margarine;
   (x) salad dressings;
   (xi) condiments;
   (xii) seasonings and flavorings;
   (xiii) meat and poultries (processed); and
   (xx) breading and stuffing;

for example, in meat flavored foodstuffs the red meat, "bloody" notes are enhanced. As a further example, in cheese flavors and cheese flavored foodstuffs the "sophisticated Roquefort" nuances are augmented or enhanced.

II. Description of the Prior Art

It is well known that the combination of monosodium L-glutamate (MSG) and a flavor inducing 5'-nucleotide, such as disodium inosine-5'-monophosphate (IMP), disodium guanosine-5'-monophosphate (GMP), or mixtures thereof, exhibit a synergistic flavoring activity. Moreover, mixtures comprising MSG and a flavor inducing 5'-nucleotide have long been widely used as economical flavoring agents or seasoning agents for various foods and beverages.

U.S. Pat. No. 4,258,072 issued on Mar. 24, 1981 discloses a mixed seasoning comprising 100 parts by weight monosodium glutamate; 0.05 to 25 parts by weight of a flavor inducing 5'-nucleotide; 5.0 to 38.0 parts by weight of sodium chloride; 0.1 to 0.87 parts by weight succinic acid and/or sodium succinate; and 0.5 to 10.0 parts by weight of at least one alkali metal salt of an organic acid which may be sodium fumarate, sodium citrate, sodium or calcium lactate, sodium maleate, sodium tartrate, sodium ascorbate or sodium aspartate.

U.S. Pat. No. 4,216,244 issued on Aug. 5, 1980 discloses a low sodium seasoning which includes potassium chloride as its major ingredient together with other nonsodium compounds masking the bitterness of the potassium chloride so that the seasoning can be substituted for sodium chloride seasonings.

U.S. Pat. No. 4,216,244 specifically discloses a low sodium salt seasoning consisting by weight of a mixture of about 90 percent low sodium salt base and about 10 percent low sodium diluent, with the base consisting by weight of a mixture of about 92 percent potassium chloride, about 3 percent L-glutamic acid and about 1 percent each of monopotassium glutamate, potassium citrate and potassium phosphate.

U.S. Pat. No. 4,066,793 issued on Jan. 3, 1978 discloses seasoning compositions, and processes for their production, which have an improved and enhanced meat-like flavor, and comprise mixtures containing extracts of yeast autolysates, 5'-nucleotides, sodium chloride and potassium salts; the potassium ion concentration being more than 0.5 times the sodium ion concentration.

Yamada in German Offenlegungsschrift No. 3144-166, French Patent No. 2,493,681 and Japan Published Application No. J57-079860 discloses a seasoning composition which may be either:

(i)
   15–21 weight percent magnesium chloride;
   3–10 weight percent magnesium sulfate;
   2–4 weight percent potassium chloride;
   0.2–0.5 weight percent magnesium bromide; and
   2–7 weight percent sodium chloride; or
(ii)
   15–21 weight percent magnesium chloride;
   6–9 weight percent magnesium sulfate;
   2–4 weight percent potassium chloride;
   0.2–0.4 weight percent magnesium bromide;
   2.6 wight percent sodium chloride; and
   0.1–21 weight percent calcium salt.

The Yamada patents and patent applications indicate that when the salt composition is diluted, it does not give bitterness but gives a round taste and gives rise to intensity of the saltiness of common salt.

Issued Japanese Patent No. J82-022311 discloses a synergistic seasoning composition containing monosodium glutamate, a nucleic acid type tasting comound, sodium chloride, succinic acid salt and at least one other sodium salt. The seasoning is composed of:

(i) monosodium glutamate;
(ii) nucleic acid-type tasting substance such as disodium inosine-5'-monophosphate and/or disodium guanosine-5'-monophosphate;
(iii) sodium chloride;
(iv) succinic acid and/or sodium succinate; and
(v) at least one salt selected from the group consisting of monosodium furmarate, trisodium citrate, monosodium lactate, calcium lactate, disodium malate, disodium tartarate, sodium ascorbate and monosodium aspartate.

The abstract of Japanese Patent No. J8 2022311 is as follows:

"Synergistic seasoning compsn.—contains mono:sodium glutamate, nucleic acid type tasting cpd., sodium chloride succinic acid salt and at least one other sodium salt The seasoning is composed of (1) monosodium glutamate, (2) nucleic acid-type tasting substance (e.g. disodium inosine-5'-monophosphate and/or disodium guanosine-5'-monophosphate), (3) sodium chloride, (4) succinic acid and/or sodium succinate and (5) at least 1 salt selected from monosodium fumarate, trisodium citrate, monosodium lactate, calcium lactate, disodium malate, disodium tartarate, sodium ascorbate and monosodium aspartate. The ratio (1):(2)=1:0.0005-0.25, esp. 1:0.001-0.15; (1)+(2):(3)=1:0.05-3, esp. 0.07-0.25. (1)+(2):(4)=1:0.0010-0.0070, esp. 1:0.0015:0.0055. (1)+(2):(5)=1:0.005-0.080, esp. 1:0.010-0.070. (4) and (5) are expressed as the free acid.

"By combining sodium chloride (4) and (5) the tasting strength of the seasoning can be increased and its taste made similar to that of monosodium glutamate."

Derwent Abstracts ("FOODOC"/January, 1983)

U.S. Pat. No. 3,821,368 issued on June 28, 1974 discloses a therapeutic composition of an aqueous medium containing about 75-150 moles sodium ions; 5-50 moles potassium ion; 5-50 moles bicarbonate ions; 75-150 moles chloride ion and preferably containing about 1-30 moles magnesium ion and about 1-30 moles of $HPO_4^{--}$ and/or $SO_4^{--}$ ion with a solution having a pH of about 5.95-8.4 and an osmolality of about 170-460.

Japanese Patent No. 82-00777 issued on Jan. 7, 1982 and abstracted at Chem.Abstract, Vol. 96, 161168h discloses a salt composition for sea food preservation containing 0.15-1% sodium chloride and a mixture of magnesium sulfate and calcium sulfate (1:1) weight ratio. It is indicated the magnesium sulfate and calcium sulfate marketedly improved the flavor of the food product.

U.S. Pat. No. 4,332,823 discloses a process for preparing a fabricated meat comprising the sequential steps of:
(a) emulsifying meat or meat by-products;
(b) admixing a salt, with the emulsified meat or meat by-products, in a weight-percent proportion of 1.5-3% based on the weight of of the fabricated product, the salt being present in a proportion sufficient to extract salt soluble protein from the emulsified meat or meat by-products, the salt being selected from the group consisting of sodium chloride, potassium chloride, sodium phosphate, potassium phosphate, sodium polyphosphates and potassium polyphosphates;
(c) extracting the salt soluble protein from the meat and meat by-products;
(d) admixing texturized soy with the emulsified meat or meat by-products, extracted protein and salt;
(e) forming the mixture into a desired shape;
(f) blanching the shaped mixture in a temperature range of 170°-210° F.; and
(g) thereafter maintaining the moisture content of the fabricated meat and meat by-products in the range of up to about 70%,
the weight-percent proportions of the ingredients being:
meat and meat by-products: 72-92% and
texturized soy: 8-20%.

U.S. Pat. No. 4,340,614 issued on July 20, 1982 discloses a stringently sodium-restricted dietetic salt in its preparation which consists of a mixture of from 60-85 weight percent potassium chloride; 10-30 weight percent potassium adipate; 2-5 weight percent potassium tartrate; 0.5-2 weight percent potassium glutamate; 0.5-2 weight percent adipic acid; and from 0.004 up to 0.06 weight percent of potassium inosinate and/or potassium guanylate.

Nothing in the prior art, however, discloses the composition of our invention as defined above, particularly its use in augmenting or enhancing the aroma or taste of meat products, snack cheese products and the like.

THE INVENTION

Figure 1:
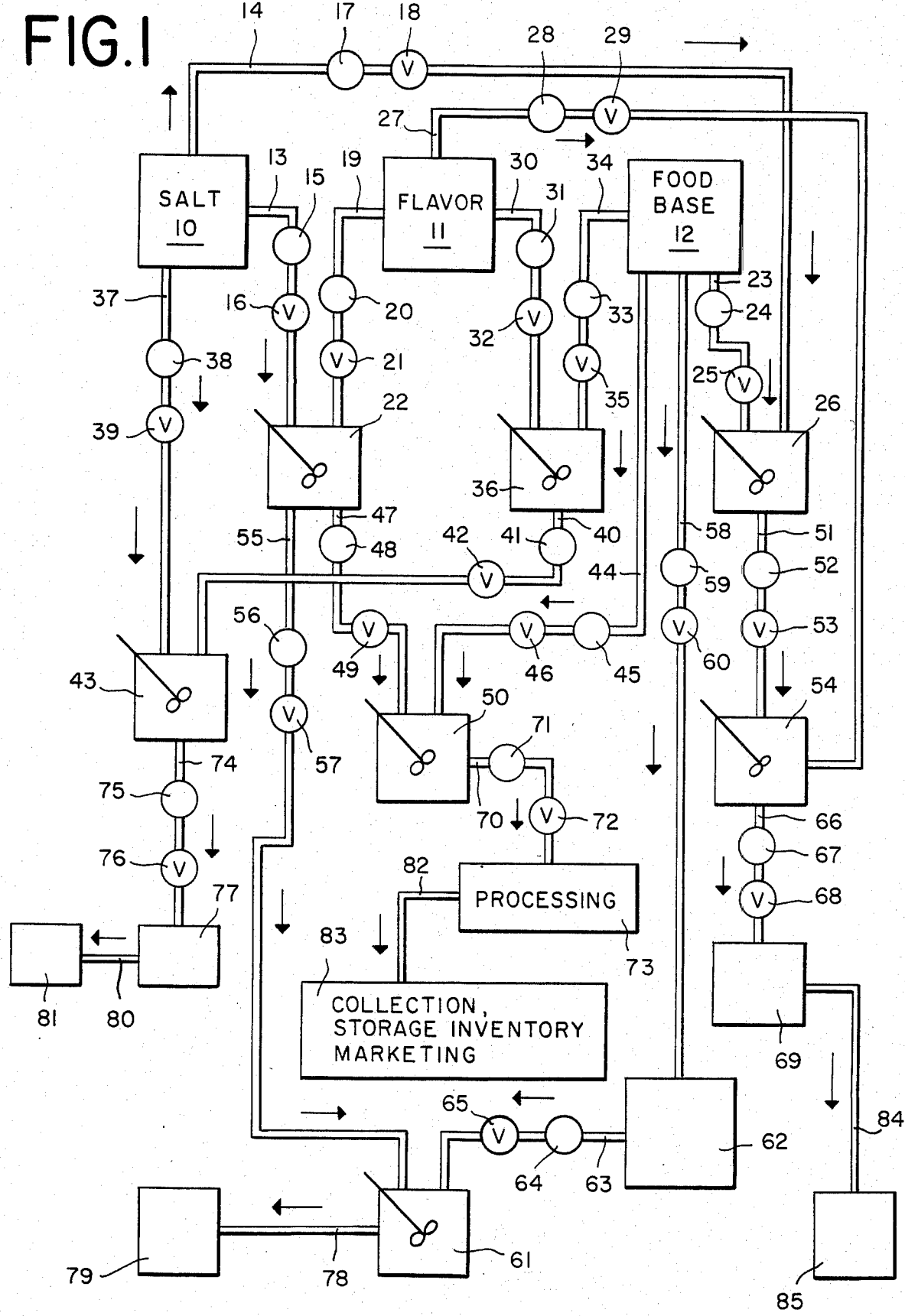
FIG. 1 is a schematic diagram capable of using alternative and/or sequential and/or simultaneous processes of our invention, which, in turn, use one or more of the mixed seasonings of our invention.

This invention relates to the use in augmenting or enhancing the aroma or taste of meat flavored, cheese flavored and savory flavored foodstuffs, animal foods and snacks, to wit:
(A) Dairy Type Foods
  (i) processed cheese;
  (ii) cheese spread;
  (iii) cheese dip;
  (iv) cheese analogues and imitation cheese analogues;
(B) Animal foods
  (i) dog foods;
  (ii) cat foods;
(C) Savory flavored foods
  (i) extruded snacks;

(ii) crackers, pretzels, potato chips and the like;
(iii) meat sauces, white sauces and gravies;
(iv) casseroles;
(v) cheese sauces;
(vi) soups (instant and finished)
(vii) prepared meats and meats spreads;
(viii) meat and poultry analogues and extenders and the like;
(ix) margarine;
(x) salad dressings;
(xi) condiments;
(xii) seasonings and flavorings;
(xiii) meat and poultry (processed); and
(xxi) breading and stuffing;

of a composition of matter consisting essentially of:
(a) from about 0.25 up to about 0.80 mole percent (herein and hereinafter to be understood as meaning a percentage based on total moles of cations, anions, and substantially nonionized organic acids) on a dry basis of a lactic acid/lactate species mixture having the structures:

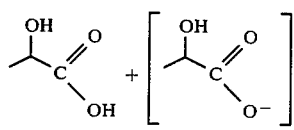

(b) from 0 up to about 0.09 mole percent on a dry basis of glycollic acid/glycollate ion species mixture having the structure:

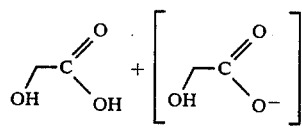

(c) from 0 up to about 10.0 mole percent on a dry basis of magnesium ion;
(d) from about 6 mole percent up to about 50 mole percent on a dry basis of a phosphate/monoacid phosphate/diacid phosphate/phosphoric acid species mixture having the formula:

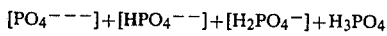

taken alone or taken further together with at least one of the species tripolyphosphate, pyrophosphate and/or polymetaphosphate (e.g., $K_5P_3O_{10}$; $K_4P_2O_7$; $[KPO_3]_x$ respectively, wherein x represents a repeating number of monomeric units to form a polymer);
(e) from 0 mole percent up to about 40 mole percent on a dry basis of sodium ion;
(f) from about 8 mole percent up to about 50 mole percent on a dry basis of potassium ion;
(g) from about 0.3 mole percent up to about 16 mole percent on a dry basis of chloride ion;
(h) from 0 mole percent up to 30 mole percent on a dry basis of carbonate/bicarbonate/carbonic acid species mixture having the formula:

(j) from 0 mole percent up to about 2.0 mole percent on a dry basis of monobasic glutamate/dibasic glutamate/glutamic acid species mixture having the formulae:

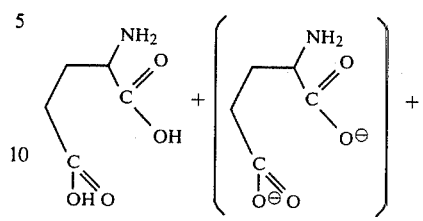

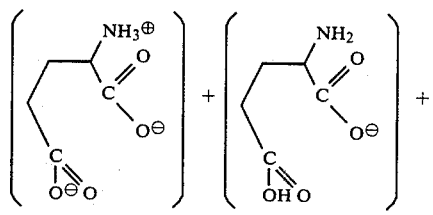

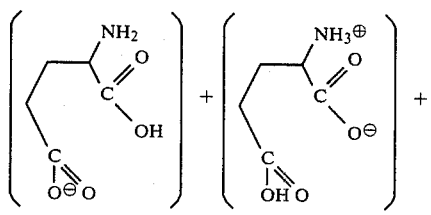

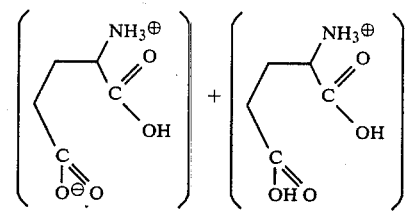

(k) from 0 up to about 0.6 mole percent on a dry basis of calcium ion;

with the proviso that the sum total of mole percent on a dry basis of sodium ion, potassium ion, magnesium ion and calcium ion is from about 48 mole percent up to about 60 mole percent; and with the proviso that the sum total of carbonate/bicarbonate/carbonic acid ion species mixture having the formula:

taken together with the sum total mole percent on a dry basis of the phosphate/monobasic phosphate/dibasic phosphate species mixture having the formula:

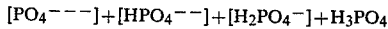

taken alone or taken further together with the species tripolyphosphate, pyrophosphate and/or polymetaphosphate is from about 34 mole percent up to about 50 mole percent.

The foregoing composition when in aqueous solution (e.g., a soup such as a chicken soup or clam chowder) has a pH in the range of from about 6 up to about 10.

In said aqueous solution, the concentrations of ion and acid species are:

(a) from about $2\times10^{-4}$ up to about $7\times10^{-4}$ moles per liter of the lactic acid/lactate ion species defined according to the structures:

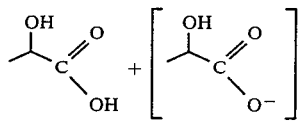

(b) from 0 up to about $9\times10^{-5}$ moles per liter of the species glycollic acid/glycollate ion defined according to the structures:

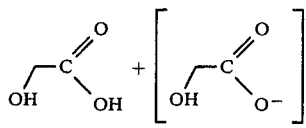

(c) from 0 moles per liter up to about $1.5\times10^{-3}$ moles per liter of the ion/acid species, glutamic acid/monobasic glutamate/dibasic glutamate defined according to the structures:

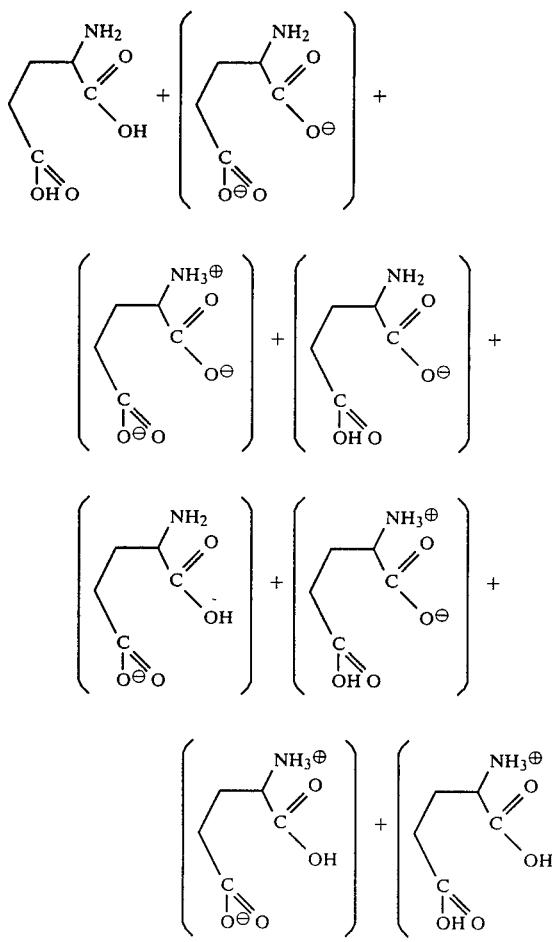

(d) from about $3\times10^{-4}$ up to about $1.6\times10^{-2}$ moles per liter of the chloride ion species;

(e) from about $3\times10^{-3}$ up to about $1\times10^{-1}$ moles per liter of the acid/ion species, phosphoric acid/monoacid phosphate/diacid phosphate/phosphate having the formula:

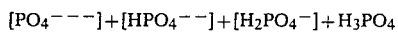

taken alone or taken further together with the species tripolyphosphate (e.g., $K_5P_3O_{10}$); pyrophosphate (e.g., $K_4P_2O_7$); and/or polymetaphosphate (e.g., $[KPO_3]_x$ wherein x represents a repeating number of monomeric units to form a polymer);

(f) from 0 up to about $2\times10^{-3}$ moles per liter of the ion/acid species carbonate/bicarbonate/carbonic acid having the formula:

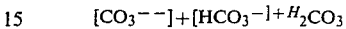

(g) from 0 up to about $4\times10^{-2}$ moler per liter of the sodium ion species;

(h) from about $4\times10^{-3}$ up to about $9\times10^{-3}$ moles per liter of the potassium ion species;

(j) from about 0 up to about $1\times10^{-2}$ moles per liter of the magnesium ion species;

(k) from about 0 up to about $6\times10^{-4}$ of the calcium ion species;

with the provisos:
 (i) that the mole ratio of metal cation:total acid and ion is from about 0.4 up to about 0.7;
 (ii) that the concentration of ions and acids is from about 0.04 up to about 0.25 moles per liter; and
 (iii) that the range of concentration of metal cations is from about 0.02 up to about 0.15 moles per liter.

Preferably, the composition of matter of our invention is limited to a mixture of:
 (i) from about 60 weight percent up to about 96 weight percent on a dry basis of a substance selected from the group consisting of (a) $KH_2PO_4$ or (b) $K_2HPO_4$ or (c) a mixture of $Mg_3(PO_4).4H_2O$ and $K_2CO_3$;
 (ii) from about 0.4 up to about 3.5 weight percent on a dry basis of lactic acid;
 (iii) from about 0.4 up to about 17.0 weight percent on a dry basis of a compounds selected from the group consisting of sodium chloride, potassium chloride and calcium chloride; and
 (iv) from about 1.75 up to about 3.25 weight percent on a dry basis of monosodium glutamate or monopotassium glutamate or a mixture of same (with the proviso that the sum total of the ingredients cannot be greater than 100%).

More preferably, the composition of our invention consists essentially of the foregoing mixture with the following limitations:
 (i) from about 60 weight percent up to about 96 weight percent on a dry basis of a substance selected from the group consisting of (a) $KH_2PO_4$ or (b) $K_2HPO_4$ or (c) a mixture of $Mg_3(PO_4).4H_2O$ and $K_2CO_3$;
 (ii) from about 0.4 up to about 3.5 weight percent on a dry basis of lactic acid;
 (iii) from about 0.4 up to about 17.0 weight percent on a dry basis of a compound selected from the group consisting of sodium chloride, potassium chloride and calcium chloride;
 (iv) from about 1.75 up to about 3.25 weight percent on a dry basis of monosodium glutamate or monopotassium glutamate or a mixture of same; and in addition
 (v) from about 4.0 weight percent up to about 25.0 weight percent of a compound selected from the group consisting of $MgCO_3$, $KHCO_3$ and $NaHCO_3$ (with the proviso that the sum total of the ingredients cannot be greater than 100%).

We have discovered that the foregoing composition brings out the bloody, "rare meat" notes in meat flavored foodstuffs, e.g., hamburgers, sausages, steaks and the like. Furthermore, the foregoing composition causes vegetarian meat compositions to have a "rare meat" note thereby causing these vegetarian meat compositions to be more palatable and aesthetically pleasing. We have also discovered that the use of the foregoing compositions enhances the flavor of cheese snack foods and brings out the natural cheese character of the cheese snack foods while requiring a lesser quantity of sodium chloride than that ordinarily required in such cheese snack foods.

According to the present invention 3,5'-nucleotides or their alkali metal salts may be also used in conjunction with the salts but, in all cases the amount of 5'-nucleotide which is useful is much less than that ordinarily required as in the case of, for example, U.S. Pat. No. 3,318,710 issued on May 9, 1967.

The foregoing salt composition aids in elimination of the well known "potassium ion after taste" in, for example, barbecue types of tastes and, in a number of examples can substantially or even entirely replace sodium salts and/or monosodium glutamate with non-sodium ion and/or non-glutamate ion containing substances.

The mixed seasonings according to the present invention can be used to alter, vary, fortify, modify, enhance or otherwise improve the organoleptic properties, including flavor and/or aroma, of a wide variety of materials which are ingested, consumed, or otherwise organoleptically sensed by mammalian species including human beings and pets, e.g., cats and dogs.

The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor or aroma impression to modify the organoleptic character. The materials which are so altered are generally referred to herein as consumable materials.

Such mixed seasonings according to the present invention are accordingly useful in flavoring compositions. Flavoring compositions are herein taken to mean those which contribute a part of the overall flavor impression by supplementing or fortifying a natural or artificial flavor in a material, as well as those which supply substantially all the flavor and/or aroma to a consumable article.

The term "foodstuff" as used herein includes both solid and liquid ingestible materials for man or animals, which materials usually do, but need not, have nutritional value. Thus, foodstuffs includes meats, gravies, soups and convenience foods, vegetables, snack foods, dog and cat foods, other veterinary products, and the like.

When the mixed seasonings according to this invention are used in a food flavoring compositions, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional material can be used and broadly include other flavor materials, vehicles, stabilizers, thickeners, surface active agents, conditions, and flavor intensifiers.

Examples of preferred co-flavoring adjuvants are:
Methyl thiazole alcohol (4-methyl-5-$\beta$-hydroxyethyl thiazole);
2-Methyl butanethiol;
4-Mercapto-2-butanone;
3-Mercapto-4-pentanone;
1-Mercapto-2-propanone;
Benzaldehyde;
Furfural;
Furfuryl alcohol;
2-Mercapto propionic acid;
2-Methylfuran-3-thiol;
2-Methyldihydrofuran-3-thiol;
2-Methyltetrahydrofuran-3-thiol;
2-Ethylfuran-3-thiol;
2-Ethyldihydrofuran-3-thiol;
Methyl pyrazine;
2-Ethyl-3-methyl pyrazine;
Tetramethyl pyrazine;
Dipropyl disulfide;
Methyl benzyl disulfide;
Allyl thiophenes;
2-Butyl thiophene;
2,3-Dimethyl thiophene;
5-Methyl furfural;
Acetyl furan;
2,4-Decadienal;
Guiacol;
Phenyl acetaldehyde;
$\delta$-Decalactone;
d-Limonene;
Acetoin;
Amyl acetate;
Maltol;
Ethyl butyrate;
Levulinic acid;
Piperonal;
Ethyl acetate;
n-Octanal;
n-Pentanal;
n-Hexanal;
Diacetyl;
Monosodium glutamate;
Sulfur-containing amino acids;
Cysteine;
Hydrolyzed vegetable protein;
Hydrolyzed fish protein; and
Tetramethyl pyrazine.

The mixed seasonings, or the compositions incorporating them, as mentioned above, can be combined with one or more vehicles or carriers for adding them to the particular product. Vehicles can be edible or otherwise suitable materials such as ethyl alcohol, propylene glycol, water and the like. Carriers include materials such as gum arabic, carragennan, other gums, and the like. The mixed seasonings according to this invention can be incorporated with the carriers by conventional means such as spray-drying, drum-drying, and the like. Such carriers can also include materials for coacervating the mixed seasonings (and other flavoring ingredients, as present) to provide encapsulated products. When the carrier is an emulsion the flavoring composition can also contain emulsifiers such as mono- and diglycerides of fatty acids and the like. With these carriers or vehicles, the desired physical form of the composition can be prepared.

The quantity of mixed seasonings or mixtures thereof utilized should be sufficient to impart the desired flavor characteristic to the product, but on the other hand, the use of an excessive amount of the derivative is not only wasteful and uneconomical, but in some instances too large a quantity may unbalance the flavor or other organoleptic properties of the product consumed. The quantity used will vary depending upon the ultimate foodstuff; the amount and type of flavor initially present in the foodstuff; the further process or treatment steps to which the foodstuff will be subjected; regional and other preference factors; the type of storage, if any, to which the product will be subjected; and the preconsumption treatment, such as baking, frying, and so on, given to the product by the ultimate consumer. Accordingly, the terminology "effective amount" and "sufficient amount" is understood in the context of the present invention to be quantitatively adquate to alter the flavor of the foodstuff.

It is accordingly preferred that the ultimate foodstuff (e.g., snack or soup or the like) compositions contain:
(i) On a dry basis from about 0.5% up to about 25%; and
(ii) On a wet basis from about 0.02% up to about 1.5%.

More specifically, the range in dry soups is from about 2.0 up to about 10% and the range in the aqueous soup ("ready to eat") is from about 0.05% up to about 0.2%.

The amount of mixed seasonings of our invention to be utilized in flavoring compositions can be varied over a wide range depending upon the particular quantity to be added to the foodstuff. Thus, amounts of one or more seasonings according to the present invention, of from about 0.5% up to 100% of the total "flavoring" composition can be incorporated in such compositions. Thus, for example, in snack foods, between 30 and 35% of the flavored coating of the snack food is the seasoning of our invention.

| Ingredients | Parts by Weight |
| --- | --- |
| $KH_2PO_4$ | 85.94 |
| 22% Lactic Acid | 2.48 |
| $CaHPO_4.2H_2O$ | 0.72 |
| KCl | 3.96 |
| $MgCO_3$ | 4.90 |
| Monopotassium glutamate monohydrate | 2.00 |

DETAILED DESCRIPTION OF THE DRAWINGS

FIG. 1 sets forth a diagram in schematic form of apparatus used to carry out alternatively and/or in sequential form a process utilizing the mixed seasonings of our invention in combination with processed food bases and other flavorants as set forth, supra.

A mixed seasoning as set forth, supra at feeding location 10 is fed in the alternative:
(i) Through line 14 using conveyor means 17 and variable feed means 18; and
(ii) Through line 37 using conveyor means 38 and variable feed means 39 or through line 13 using conveyor means 15 and variable feed means 16;
into one of the mixing vessels 43, 22 and/or 26. Thus, the mixed seasoning can be simultaneously conveyed at varying rates into each of tanks 43, 22 and 26 or in the alternative one of tanks 43, 22 or 26 or two of those tanks 43, 22 and/or 26. Examples of the mixed seasoning are set forth in the examples, infra. Thus, for example, the mixed seasoning 10 could be a mixture of:

| Ingredients | Parts by Weight |
| --- | --- |
| $KH_2PO_4$ | 72.38 |
| 22% Lactic Acid | 2.09 |
| 85% Glycollic Acid | 0.05 |
| $CaHPO_4.2H_2O$ | 0.61 |
| NaCl | 3.54 |
| KCl | 0.35 |
| Monosodium Glutamate monohydrate | 1.90 |
| $KHCO_3$ | 14.89 |
| $MgCO_3$ | 4.13 |

An example of the flavor in vessel 11 is that set forth in Example XIII of U.S. Pat. No. 4,098,910 the specification for which is incorporated by reference herein. Thus, an example of the flavor in vessel 11 is one which is prepared as follows:

The following ingredients are refluxed for four hours:

| Ingredients | Parts by Weight |
| --- | --- |
| L-Cysteine hydrochloride | 0.9 |
| Carbohydrate-free vegetable protein hydrolysate | 30.9 |
| Thiamine hydrochloride | 0.9 |
| Water | 67.30 |

The resulting mixture is then aged for three days and an aliquot portion is withdrawn and dried. Based on the weight of the dry solid obtained, sufficient gum arabic is added to the batch to provide a composition containing one part by weight of gum arabic. The composition is then spray-dried.

Ethyl(2-methyl-3-furyl)disulfide is added to the spray-dried material at the rate of 4 ppm.

A food base in vessel 12 may be conveyed in the alternative, in sequence or simultaneously at the same or different rates through lines 34 using conveyance means 33 and conveyance flow rate controller 35; through line 44 using conveyance means 45 and flow rate controller 46; through line 58 using conveyance means 59 and flow control means 60; and/or through line 23 using conveyance means 24 and flow controller 25 into mixing vessel 50 and/or processing vessel 62 and/or mixing vessel 26 and/or mixing vessel 36. An example of such as food base is that which is set forth in U.S. Pat. No. 4,332,823 issued on June 1, 1982, the specification for which is incorporated by reference herein. Such a food base which would be held in vessel 12 is produced according to Example I at column 5, lines 20-50 of U.S. Pat. No. 4,332,823 (the specification of which is incorporated by reference herein) and is as follows:

"86 Pounds of frozen beef carcass are ground in a commercial beef grinder and thereafter passed to a commercial emulsifying machine where the ground meat is emulsified. Upon exiting from the emulsifier the meat is at a temperature of approximately 28° F. The emulsified meat is conveyed to a mixing tank where pounds of sodium chloride are added and mixing of the emulsified meat and salt is permitted to continue for approximately 6 minutes. During that time the temperature of the mass rises to approximately 33° F. The salt is dissolved in the water content of the emulsion and extracts the soluble protein from the meat. Thereafter, 12 pounds of TVP soy is added and mixing is continued for about 6 minutes. Upon exiting from the mixing vessel the temperature has gone up to approximately 44° F. Thereafter, the mass is converted to a chunk former machine where the cylindrical chunks approximately ⅞ inches in diameter and 1 inch in height are formed. The small cylindrical chunks of the meat mass are removed from the forming machine and conveyed to a water blancher which is maintained at approximately 200° F.–210° F. The chunks have a residence time in the blancher of approximately 4 minutes during which time the external parts of the chunks reach about that temperature. Upon removal from the blancher the chunks are relatively structurally rigid and ready for admixture with other chunk meat products to form a pet food product for commercial use."

When food bases passed through line 34 via using conveyance means 33 into mixing vessel 36 it is admixed with the flavor material from vessel 11 which is conveyed through line 30 using conveyance means 31. This mixed material is then passed through line 40 using conveyance means 41 and flow control device 42 into mixing vessel 43 where it is mixed, if desired, with the mixed seasoning of our invention being conveyed through line 37 using conveyance means 38 and flow control device 39 into mixing vessel 43. The resulting mixture emanates from mixing vessel 43 after a desired residence time "T" and proceeds through line 74 using conveyance means 75 and flow control device 76 into processing vessel 77 wherein it is processed and then passed through line 80 into receiving tank 81 where the produce is prepared for marketing.

In the alternative, or sequentially or simultaneously flavor product 11 being passed through line 19 is admixed with mixed seasoning 10 being passed through line 13 into mixing vessel 22. The resulting mixed seasoning/flavor product may then sequentially or in the alternative be passed through line 55 using conveyance means 56 and flow control device 57 into mixing vessel 61 where it is mixed with processed food base coming from processing tank 62 through line 63 using conveyance device 64 and flow control device 65. Sequentially or in the alternative or simultaneously, the mixed flavor/mixed seasoning of vessels 11 and 10 evolving from mixing tank 22 are passed through line 47 using conveyance device 48 and flow control device 49 into vessel 50 wherein it is mixed with the food base coming from vessel 12 through line 44 using conveyance device 45 and flow control device 46. Thus, mixed seasoning/flavor/food base composition of matter is then held in mixing vessel 50 for a desired residence time whereupon it is passed through line 70 using conveyance device 71 and flow control device 72 into processing vessel 73 and then through line 82 into vessel 83 whereat it is prepared for marketing.

By the same token the mixed composition of matter evolving out of mixing vessel 61 is passed through line 78 into vessel 79 wherein it is prepared for marketing. In the alternative, sequentially or simultaneously food base from vessel 12 is passed through line 23 using conveyance device 24 and flow control device 25 into mixing vessel 26 where it is mixed with the mixed seasoning of our invention coming from vessel 10 through line 14 using conveyance device 17 and flow control device 18.

The mixing vessel 26 mixes the food base and the mixed seasoning and the resulting mixture is held for a desired residence time in mixing vessel 26 whereupon it is passed through line 51 using conveyance device 52 and flow control device 53 into mixing vessel 54 wherein it is mixed with the flavor held in vessel 11 which is passed through line 27 using conveyance device 28 and flow control device 29. The mixing taking place in mixing vessel 54 is carried on for a given residence time whereupon the resulting mixture is passed through line 66 using conveyance device 67 and flow control device 68 into processor 69. After the processing the resulting mixture is passed through line 84 into holding vessel 85, wherein it is prepared for marketing.

Figure 2:
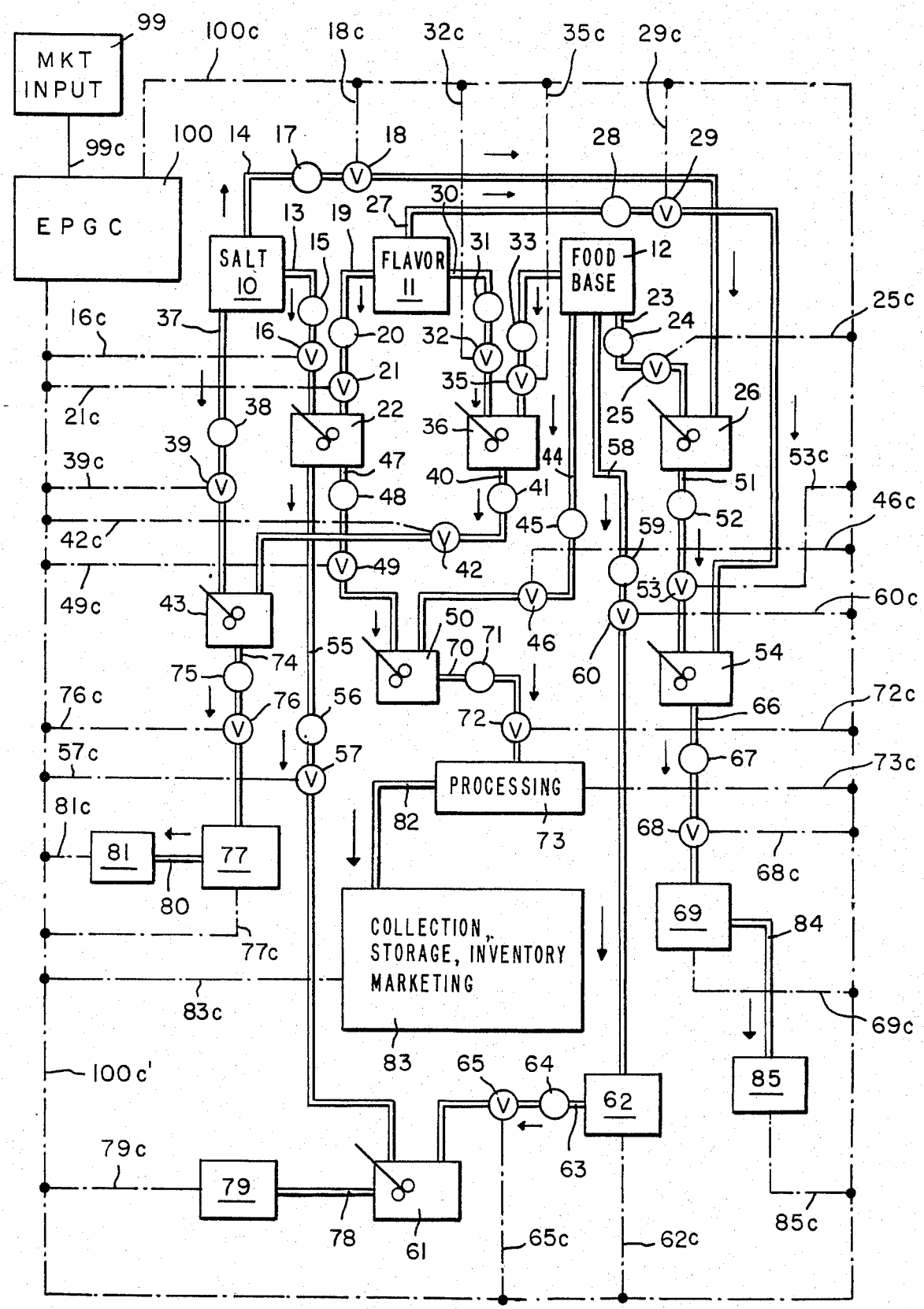
FIG. 2 shows a schematic diagram of the apparatus of FIG. 1 with an additional schematic representation of the utilization of an electronic program controller (e.g., computer system) system whereby market demand information and the like can be utilized to cause automatic alterations in the manner in which the mixed seasoning of our invention, flavors and food bases are admixed and processed.

The apparatus of FIG. 1 can be used in conjunction with electronic programming controller 100 which uses marketing input information from source 99 via controll line 99C feeding into the electronic program controller 100 and controlling the apparatus as illustrated in FIG. 1 and FIG. 2 via control lines 100C and 100C′. Thus, the apparatus shown in schematic diagram in FIG. 1 is also shown in schematic form in FIG. 2 as associated with the electronic program controller (computer mechanism) via control lines 100C and 100C′.

More specifically, mixed seasoning held in vessel 10 which may be passed in the alternative, simultaneously or in sequential order through lines 14, 37 and/or 13 respectively may have its flow controlled as a function of marketing input from information source 99 through control line 39C, for example, which controls the flow control device 39; and through control line 16C, for example, which controls flow control device 16 and through control line 18C, for example, which controls flow control device 18. Furthermore, the output of the system ending with holding vessel 79 using information fed through control line 79C is added to the memory system in a electronic program controller 100 whereby such process steps as the processing being carried out in process system 77 is controlled through control line 77C; and the processing carried out in process system 73 is controlled through control line 73C.

Furthermore, for example, the amount of flavor substance and food base passing into mixing tank 36 from vessels 11 and 12 respectively, through lines 30 and 34 respectively is controlled using control line 32C which controls flow control device 32 and control line 35C which controls flow control device 35. The residence time in mixing vessel 36 is controlled at flow control device 42 using control line 42C, for example.

In general, the workings of the apparatus as set forth in FIGS. 1 and 2 in sequential, simultaneous or alternative order is controlled using flow control devices such as 39, 21, 32, 25 and 53 by means of control lines 16C, 21C, 32C, 35C and 53C, respectively.

Figure 3:
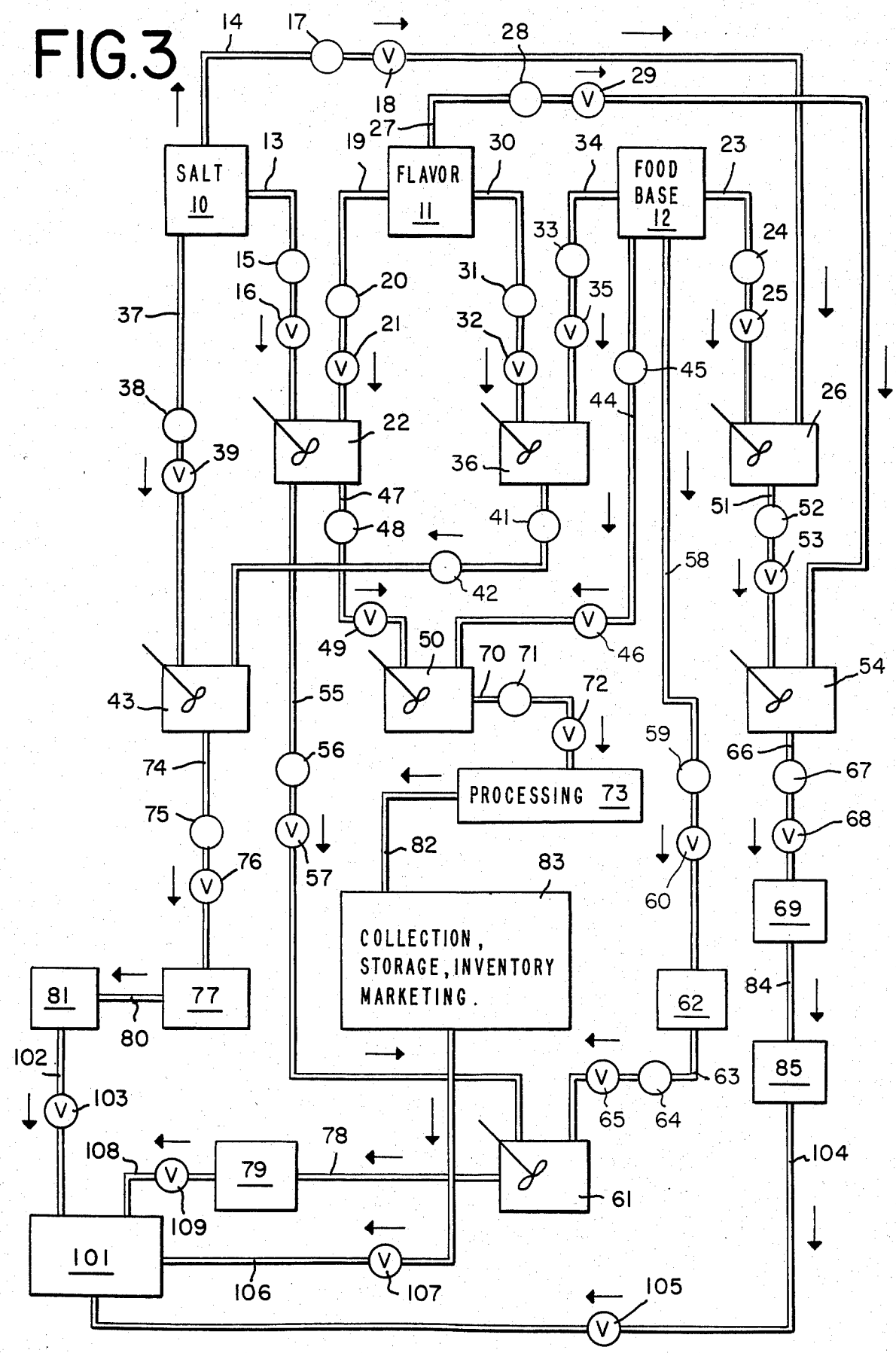
FIG. 3 set forth a schematic diagram of another embodiment of the apparatus useful in conjunction with alternative and/or sequential and/or simultaneous processes of our invention using one or more of the mixed seasonings of our invention.
Figure 4:
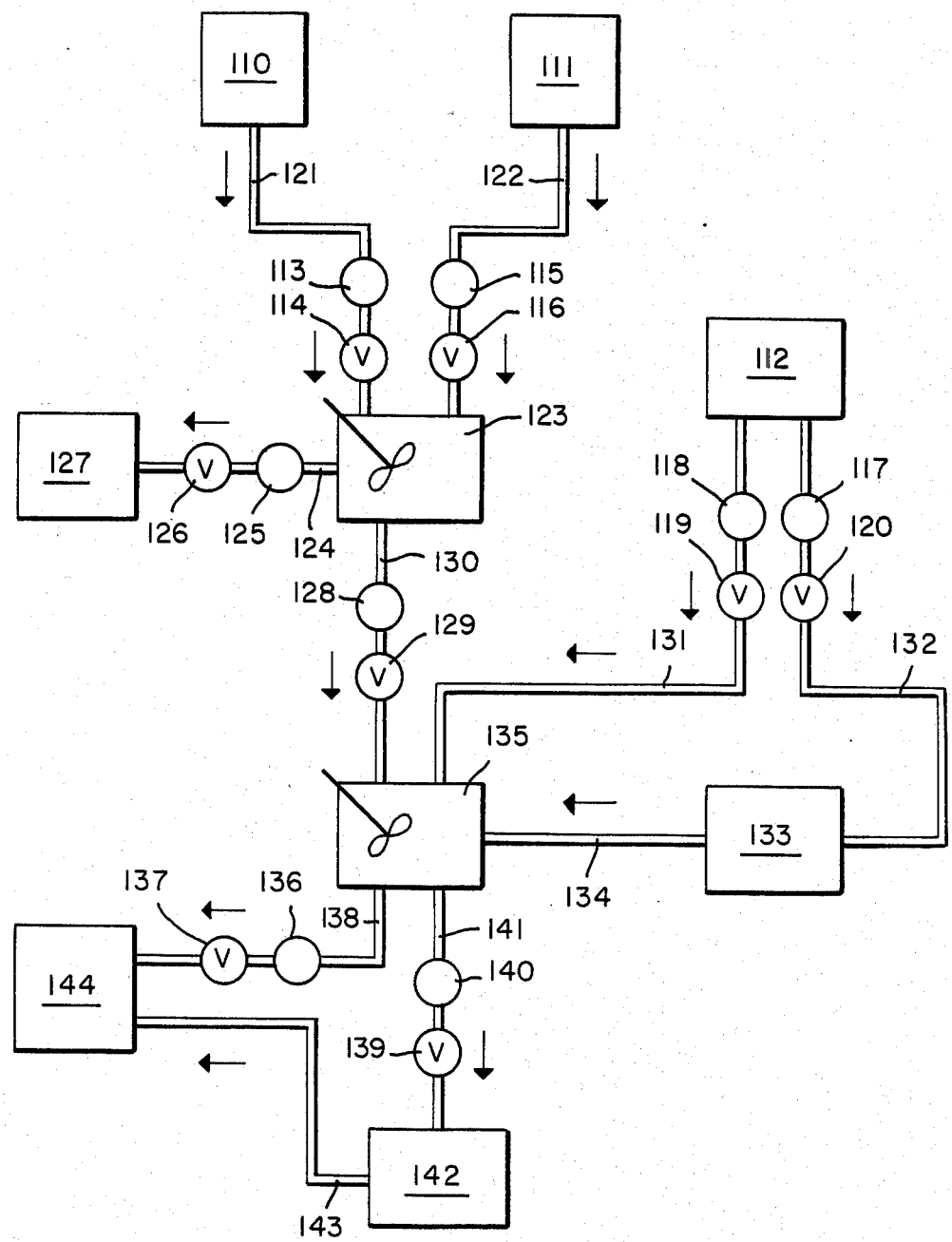
FIG. 4 represents a schematic diagram of another embodiment of the apparatus useful in conjunction with alternative and/or sequential and/or simultaneous processes of our invention using one or more of the mixed seasonings of our invention.

An additional group of embodiments of apparatus used for carrying on the process for using the mixed seasonings of our invention is set forth in FIG. 3.

In FIG. 3, mixed seasoning from vessel 10 may be passed, sequentially, alternatively or simultaneously through lines 37, 14 and 13 using conveyance devices 38, 17 and 15, respectively, and flow control devices 39, 18 and 16, respectively, into mixing vessels 43, 22 and 26, respectively. In mixing vessel 43, the mixed seasoning is admixed with a mixture coming from mixing tank 33 which mixture is produced by mixing flavor from vessel 11 passing through line 30 and food base from vessel 12 passing through line 34. In mixing tank 22, the mixed seasoning passing through line 13 through flow control device 16 is admixed with flavor from vessel 11 passing through line 19 by means of conveyance means 20 through flow control device 21. In mixing tank 36, the flavor coming from vessel 11 is mixed with food base coming from vessel 12 using conveyance means 33 through flow control device 35. The flavor from vessel 11 passing through line 30 is passed through line 30 using conveyance means 31 through flow control device 32. In mixing vessel 26 the feed base from vessel 12 is mixed with the mixed seasoning from vessel 10. The food base from vessel 12 is passed through line 23 using conveyance means 24 and flow control device 25. Mixed food base and mixed seasoning in mixing tank 26 is held there for a desired residence time before being passed through line 51 using conveyance means 52 and flow control device 53 into mixing tank 54 wherein it is mixed with flavor from vessel 11 passing through line 27 using conveyance device 28 and flow controlled device 29. The resulting mixture is held in tank 54 for a desired residence time whereupon it is passed through line 66 using conveyance device 67 and flow control device 68 into processing mechanism 69 wherein it is processed and passed through line 84 into tank 85. From tank 85 the processed product of our invention is passed through line 104 using flow control device 104 into final holding vessel 101 wherein it is prepared for marketing in admixture with products coming from vessels 81 and 79 in the alternative, simultaneously or sequentially.

By the same token mixed seasoning from vessel 10 being passed through line 37 is mixed with the mixture of flavor from vessel 11 and food base from vessel 12 coming from vessel 36 through line 40 using conveyance device 41 and flow control device 42. The mixture in vessel 43 is held for a desired residence time whereupon it is passed through line 74 using conveyance device 75 and flow control device 76 into processing mechanism 77 whereupon it is processed and passed through line 80 into holding tank 81 whereupon it is passed through line 102 through flow control device 103 into final holding vessel 101 for preparation for marketing in admixture with product from vessels 85 and 79. By the same token the mixture coming from mixing vessel 61 through line 78 and holding tank 79 through line 108 via flow control device 109 is brought into mixing tank 61 through line 55 which comes from mixing tank 22 (using conveyance device 56 and flow control device 57) and through line 63 (using conveyance device 64 and flow control device 65) from processing vessel 62. The material coming into processing vessel 62 is processed food base coming from vessel 12 (in the alternative, sequentially or simultaneously with other food base feeds). This food base from vessel 12 flows through line 58 using conveyance device 59 and flow control device 60.

In an alternative preferred embodiment of the apparatus which uses the mixed seasoning of our invention in the process of our invention, mixed seasoning from vessel 110 is combined with flavor from vessel 111. The mixed seasoning from vessel 110 is passed through line 121 through flow control device 114 and using conveyance means 113 into mixing tank 123. The flavor from vessel 111 is passed through line 122 through conveyance means 115 and flow control device 116 also into mixing vessel 123. The resulting product is held in mixing vessel 123 for a desired residence time whereupon it may be simultaneously, alternatively or sequentially passed either (i) into vessel 121 wherein it is prepared for marketing through line 124, conveyance means 125 and flow control device 126, or through line 130 using conveyance means 128 and flow control device 129 into mixing vessel 135 wherein it is mixed with food coming from vessel 112 in the alternative or simultaneously through lines 131 and/or 132. When the food product comes through line 131 it is passed through flow control device 119 using conveyance device 118 into tank 135. When the food comes through line 134 it is processed in processing means 133 after it flows through line 132 using conveyance device 117 and flow control device 120.

The product in the mixing vessel 135 is retained in the mixing vessel 135 for a desired residence time using flow control devices 137 and 139 simultaneously, in the alternative or sequentially whereupon it is passed simultaneously, sequentially or in the alternative into processing vessel 142 or into holding vessel 144. When the mixing from tank 135 is passed into processing vessel 142 it is passed through line 141 using conveyance device 140 and flow control device 139. After the processing means 142 the resulting product is passed through line 143 into tank 144 wherein it is prepared for marketing. Otherwise or sequentially or simultaneously, the product from tank 135 is passed through line 138 by means of conveyance means 136 through flow control device 137 into vessel 144 where the product is prepared for marketing.

Figure 5:
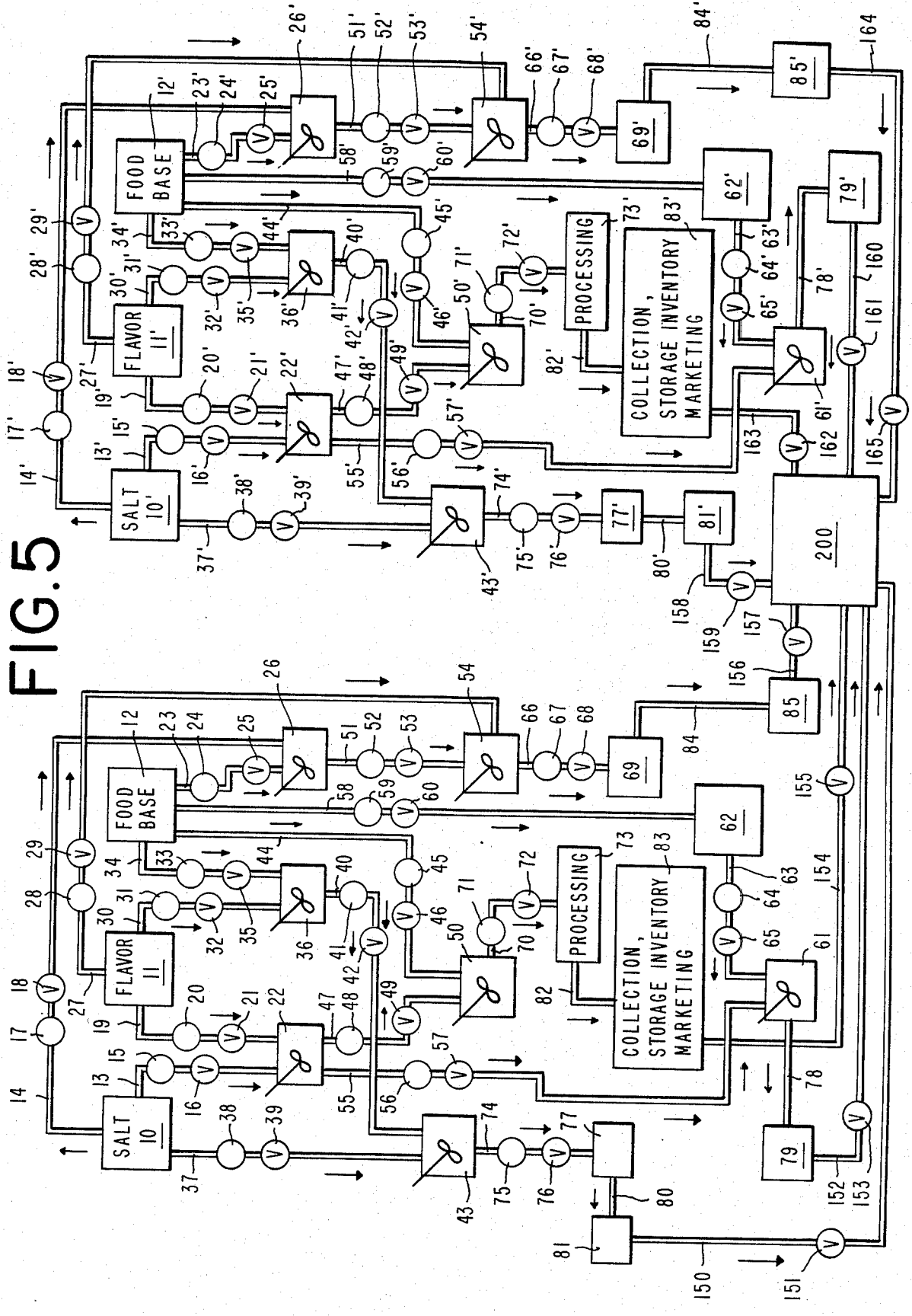
FIG. 5 represents a schematic diagram of another embodiment of the apparatus useful in conjunction with alternative and/or sequential and/or simultaneous processes of our invention using one or more of the fixed seasonings of our invention.

Apparatus as set forth and specifically described in FIG. 1 may be used in series as "apparatus blocks" wherein two or more groups of apparatus as described in FIG. 1 are employed in order to prepare a final product as shown in FIG. 5 in the vessel indicated using reference numeral "200". Thus, in the apparatus of FIG. 5, the apparatus of FIG. 1 in a first instance is shown using, for example, the mixed seasoning held in vessel 10, the flavor held in vessel 11 and the food base held in vessel 12. An additional "apparatus block" is shown also in FIG. 5 wherein the mixed seasoning is shown to be held in the vessel indicated by reference number "10'", the flavor is shown to be held in the vessel indicated by reference numeral "11'", and the food base (prior to processing) is shown to be held in the vessel indicated by reference numeral "12'".

The holding vessels in the "apparatus block" using the salt from vessel 10, the flavor from vessel 11 and the food base from vessel 12 for the product evolving from apparatus block "I" are vessels 81, 79, 83 and 85. The holding vessels for product from apparatus block "I'" using the mixed seasoning from vessel 10', the flavor from vessel 11' and the food base from vessel 12' are indicated by the reference numerals "81'", "79'", "83'" and "85'". Various mixtures can be produced in vessel 200 prior to preparation for marketing from the products from apparatus block "I" and "I'" as shown in FIG. 5. Product from holding vessel 81 may be passed through line 150 using flow control device 151 into vessel 200. Product from vessel 79 may be passed through line 152 using flow control device 153. Product from vessel 83 may be passed through line 154 using flow control device 155. Product from vessel 85 may be passed through line 156 using flow control device 157. Product from vessel 81' may be passed through line 158 using flow control device 159 into vessel 200. Product from vessel 79' may be passed through line 160 using flow control device 161 into vessel 200.

Product from vessel 83' may be passed sequentially with the other products or aternatively or simultaneously through line 163 using flow control device 162 into vessel 200. Product from vessel 85' may be passed through line 164 using flow control device 165 into holding vessel 200 wherein the resulting mixture of products or the resulting products sequentially are prepared for marketing in mechanism 200. It is understood, that the blocks of apparatus, e.g., apparatus block "I" and "I'" may be further controlled using an electronic program control mechanism as specifically ilustrated in FIG. 2, supra.

Figure 6:
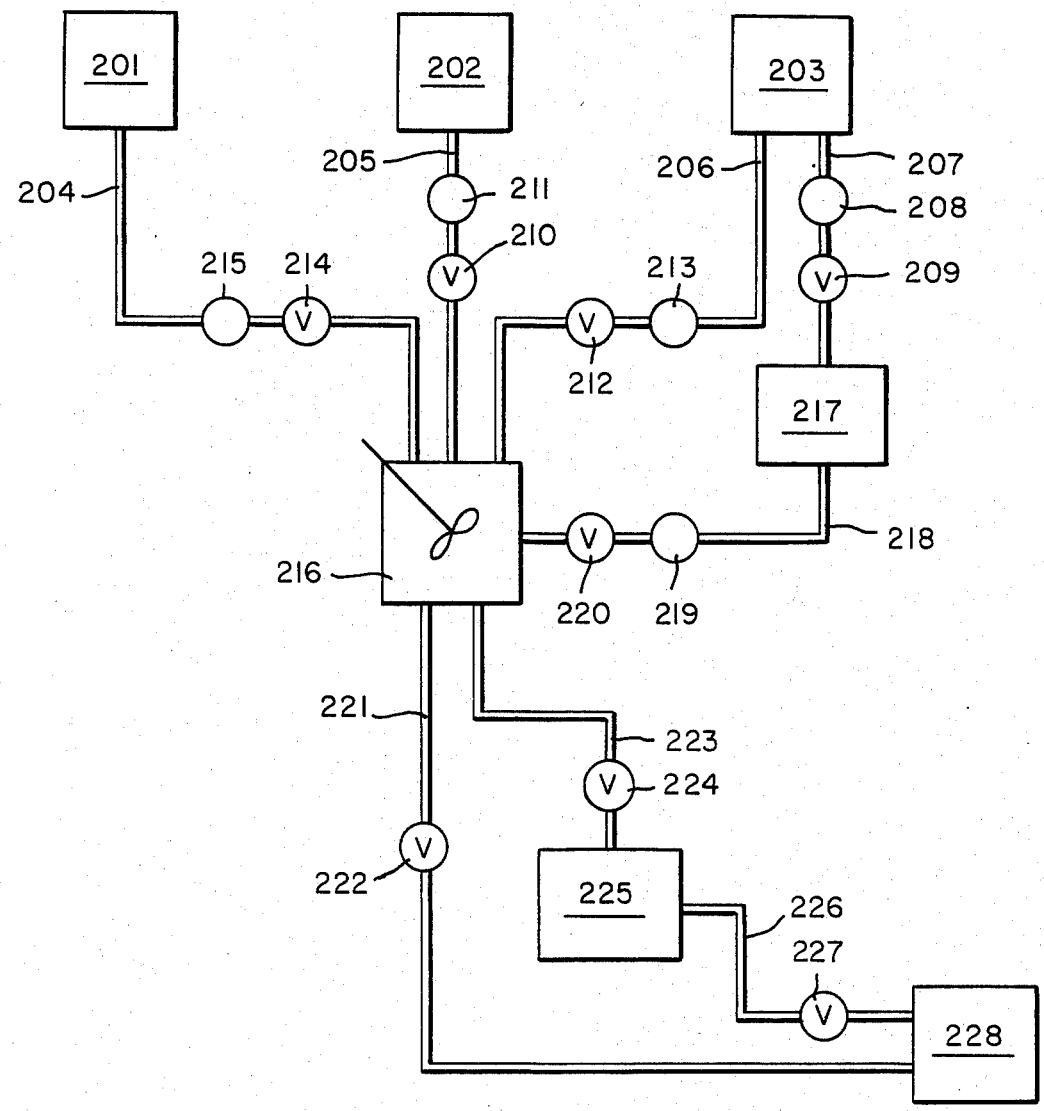
FIG. 6 represents a schematic diagram of another embodiment of the apparatus useful in conjunction with alternative and/or sequential and/or simultaneous processes of our invention using one or more of the mixed seasonings of our invention.

In an alternative embodiment of the apparatus useful in conjunction with the process using the mixed seasoning of our invention, in FIG. 6, mixed seasoning from vessel 201 is mixed with food base from vessel 203 and flavorant from vessel 202 in mixing vessel 216.

More specifically, the mixed seasoning from vessel 201 passes through line 204 using conveyance device 215 and flow control device 214. Simultaneously therewith, flavorant from vessel 202 passes through line 205 using conveyance means 211 and flow control device 210. Simultaneously therewith, food base from vessel 203 passes alternatively, sequentially or simultaneously through lines 206 and 207. When being passed through line 206 the food base is conveyed into mixing vessel 216 through conveyance device 213 using flow control device 212. When passing through line 207 the food base from vessel 203 passes into processing means 217 using conveyance device 208 and flow control device 209. The thus processed food base from means 217 passes through line 218 using conveyance means 219 and flow control device 220 into mixing vessel 216. The product is held in the mixing vessel for a desired residence time and then sequentially, aternatively or simultaneously is passed through line 221 into vessel 228 for preparation for marketing through flow control means 222 and/or through line 223 using flow control device 224 into processing vessel 225 whereupon it is processed in processing vessel or processing means 225 and then passed through line 226 through flow control device 227 into vessel 228 where it is prepared for marketing.

Figure 7:
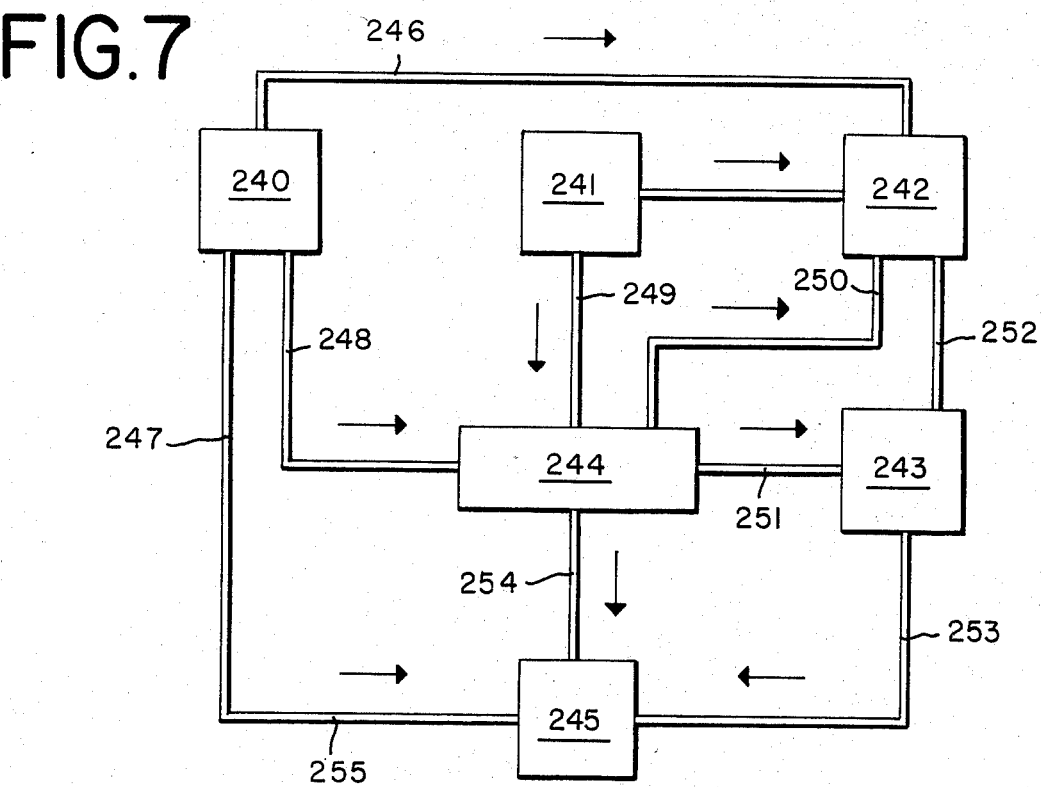
FIG. 7 represents a process flow diagram for sequential and/or alternative and/or simultaneous processes of our invention using one or more of the mixed seasonings of our invention.

FIG. 7 sets forth an abstract schematic representation of the process steps of our invention using the mixed seasoning of our invention, which process steps can take place simultaneously, in sequence, or in the alternative.

Thus, referring to FIG. 7, mixed seasoning from vessel or other holding means 240 may be passed through lines 247, 248 and/or 246 when passed through line 247 the mixed seasoning goes directly into holding vessel 245 wherein the product containing the mixed seasoning is prepared for marketing when being passed through line 248 the mixed seasoning is mixed with flavorant coming from vessel or other holding means 241 into mixed seasoning/flavorant holding means 244 when passed through line 246 the mixed seasoning is passed into vessel 242 wherein it is combined with the flavorant coming from vessel 241. Thus, flavorant from vessel 241 may be passed through line 249 or line 249'. The mixed flavorant/mixed seasoning in vessel 244 may be passed in the alternative, sequentially or simultaneously through lines 250, 251 and/or 254. When passed through line 254 the mixed flavorants/mixed seasoning is passed into the vessel 245 where it is prepared for marketing. When passed through line 251 the mixed flavorant/mixed seasoning is combined in the processing device 243 with processed food coming from vessel 242. When the flavorant from vessel 241 is passed through line 249' it is passed into the food base which is held in vessel 242. Food base from vessel 242 is usually (but not always) passed into processing means 243 and thence the resulting processed food base from 243 is passed through line 253 as a general rule into holding vessel 245 wherein it is prepared for marketing.

Figure 8:
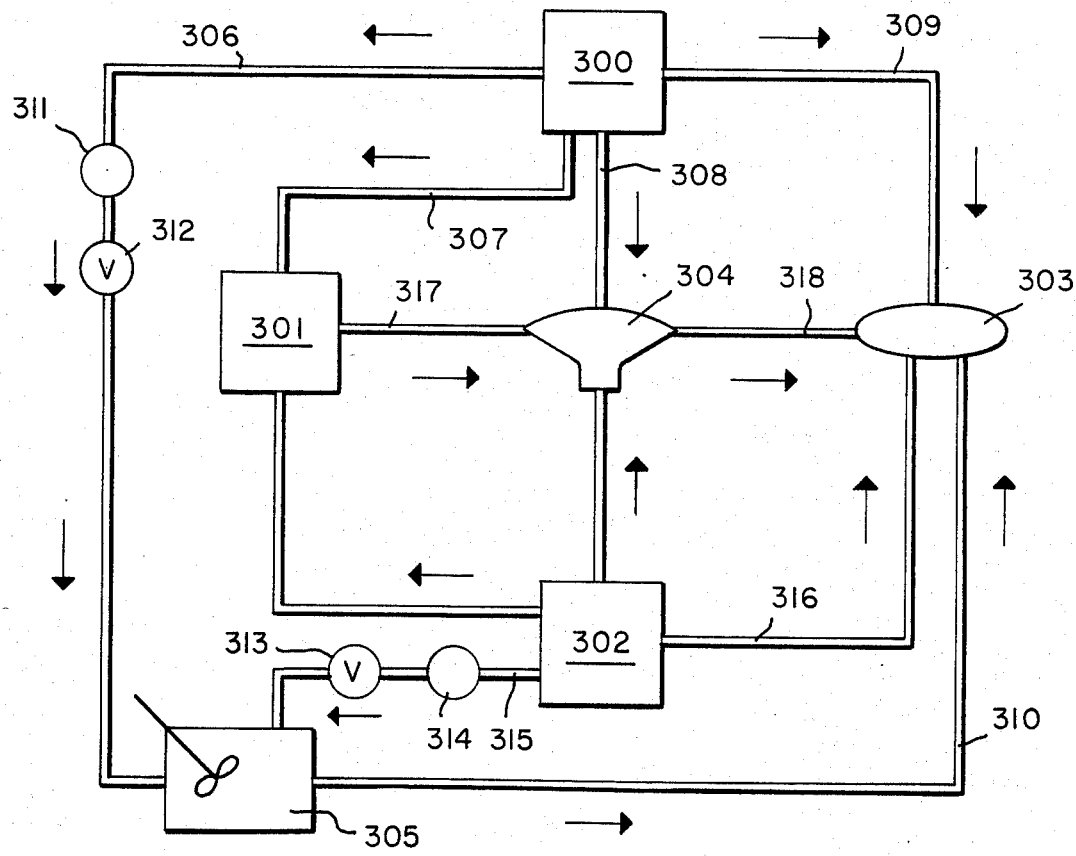
FIG. 8 represents a schematic process flow diagram setting forth alternative and/or sequential and/or simultaneous processes for utilizing one or more of the mixed seasonings of our invention in a domestic food preparation situation.

Referring to FIG. 8, FIG. 8 is a schematic diagram showing the utilization of the mixed seasoning of our invention when it is marketed by itself for use by the ultimate consumer in domestic food processing (that is, in the kitchen). The mixed seasoning from vessel 302 may be passed through line 302', 302", or 315 simultaneously, in the alternative or sequentially. When passed through line 302' it is passed into the cooking implement, if desired simultaneously or sequentially with sodium chloride coming from vessel 300. Simultaneously or sequentially sodium chloride from vessel 300 is added to the raw material (food to be cooked) at location 301 with the mixed seasoning being passed through line 302". Simultaneously, alternatively or in sequence, the mixed seasoning may be passed through line 315 using conveyance device 314 and flow control device 313 into mixing vessel 305 with sodium chloride coming from vessel 300 through line 306 using conveyance device 311 and flow control device 312. Simultaneously, sequentially or alternatively the mixed seasoning from vessel 302 may be passed into the actual served food at 303 with, optionally, sodium chloride from vessel 300 passed through line 309. Alternatively, simultaneously or sequentially the raw material having mixed seasoning and/or sodium chloride may be passed through line 317 into cooking implement(s) 304 whereupon after the desired degree of cooking it is passed through line 318 into the serving means 303 (the serving bowl or dish).

The following examples are given to illustrate embodiments of the invention as it is preferably preferred to practice it. It will be understood that these examples are illustrative and the invention is not to be considered as restricted thereto except as indicated in the appended claims.

EXAMPLES I–VII

The following table sets forth mixtures of salts (with each salt given as a weight percentage) to produce the mixed seasonings of our invention. Each mixture is given as a separate example. Each of the mixtures of each of the examples will be used in examples following XVI.

TABLE I

| Ingredient | EXAMPLE | | | | | | |
|---|---|---|---|---|---|---|---|
| | I | II | III | IV | V | VI | VII |
| KH$_2$PO$_4$ | — | 72.38 | 73.12 | 72.42 | 75.62 | — | — |
| Lactic Acid 22% | 3.09 | 2.09 | 2.11 | 2.09 | 2.18 | 3.0 | 2.29 |
| Glycolic Acid 85% | 0.08 | 0.05 | — | — | — | — | — |
| Mg$_3$(PO$_4$)$_2$.4H$_2$O | 10.90 | — | — | — | — | — | — |
| CaHPO$_4$.2H$_2$O | 0.90 | 0.61 | — | 0.61 | 0.50 | 0.70 | — |
| NaCl | 5.24 | 3.54 | 3.58 | 3.54 | 3.70 | 5.10 | 15.22 |
| KCl | 0.52 | 0.35 | — | 0.35 | 0.38 | 0.50 | 0.38 |
| Monosodium Glutamate·H$_2$O | 2.90 | 1.96 | 1.98 | 1.96 | 2.06 | 2.82 | 2.15 |
| NaHCO$_3$ | 22.02 | — | 15.04 | 14.90 | 15.56 | 21.38 | — |
| KHCO$_3$ | — | 14.89 | — | — | — | — | — |
| K$_2$CO$_3$ | 54.35 | — | — | — | — | — | — |
| MgCO$_3$ | — | 4.13 | 4.17 | 4.13 | — | — | — |
| K$_2$HPO$_4$ | — | — | — | — | — | 66.50 | 79.24 |
| Calcium Chloride | — | — | — | — | — | — | 0.72 |

EXAMPLES VIII–XVI

The following Table II sets forth mixtures of non-sodium-containing salts to produce mixed seasonings of our invention. Each mixture is given as a separate example. Each of the mixtures of each of the examples will be used in examples following the instant examples VIII–-XVI.

TABLE II

| Ingredient | EXAMPLE | | | | |
|---|---|---|---|---|---|
| | VIII | IX | X | XI | XII |
| KH₂PO₄ | 90.98 | 85.94 | 89.16 | 94.06 | 86.61 |
| Lactic Acid 22% | 2.62 | 2.48 | 2.57 | 4.24 | 3.91 |
| CaHPO₄.2H₂O | 0.77 | 0.72 | 0.75 | 0.99 | 0.91 |
| CaCl₂ | — | — | 0.43 | — | — |
| KCl | 0.44 | 3.96 | — | 0.71 | 5.75 |
| MgCO₃ | 5.19 | 4.90 | 5.08 | — | — |
| Monopotassium Glutamate·H₂O | — | 2.00 | 2.00 | — | 2.82 |

| | XIII | XIV | XV | XVI |
|---|---|---|---|---|
| KH₂PO₄ | 92.18 | 95.90 | 79.24 | 93.84 |
| Lactic Acid 22% | 4.16 | 2.77 | 2.29 | 2.71 |
| CaHPO₄.2H₂O | 0.97 | — | — | — |
| CaCl₂ | — | 0.87 | 0.72 | 0.85 |
| KCl | 0.69 | 0.46 | 15.60 | 0.45 |
| MgCO₃ | — | — | — | — |
| Monopotassium Glutamate·H₂O | 2.00 | — | 2.15 | 2.15 |

The foregoing examples, shown in mole percents of anions, cations and substantially nonionic acids (e.g., lactic acid) are set forth in terms of such ions and free acids in Table III below.

TABLE III

| Ingredient | EXAMPLE | | | | | | | | |
|---|---|---|---|---|---|---|---|---|---|
| | VIII | IX | X | XI | XII | XIII | XIV | XV | XVI |
| K⁺ | 45.3% | 45.6% | 45.5% | 49.30% | 49.3% | 49.3% | 49.0% | 49.2% | 49.0% |
| H₂PO₄⁻ | 45.0% | 41.6% | 44.4% | 48.60% | 43.2% | 47.9% | 48.6% | 35.7% | 47.8% |
| HPO₄⁼ | 0.3% | 0.276% | 0.297% | 0.402% | 0.359% | 0.399% | — | — | — |
| Ca⁺⁺ | 0.3% | 0.277% | 0.297% | 0.722% | 0.359% | 0.399% | 0.545% | 0.401% | 0.515% |
| Cl⁻ | 0.398% | 3.5% | 0.392% | 0.662% | 5.25% | 0.658% | 1.51% | 13.61% | 1.49% |
| Mg⁺⁺ | 4.15% | 3.84% | 4.11% | — | — | — | — | — | — |
| CO₃⁼ | 4.15% | 3.84% | 4.11% | — | — | — | — | — | — |
| Lactic acid | 0.434% | 0.396% | 0.425% | — | 0.646% | 0.694% | 0.465% | 0.342% | 0.458% |
| Glutamate ion | — | 0.65% | 0.668% | — | 0.942% | 0.696% | — | 0.650% | 0.735% |

Table IV below sets forth the mole ratio of metal cation (e.g., potassium ion, calcium ion and magnesium ion) to total moles of anion, cation and free acid, e.g., lactic acid.

TABLE IV

| Ingredients | EXAMPLE | | | | |
|---|---|---|---|---|---|
| | VIII | IX | X | XI | XII |
| Mole ratio of metal cation: anion + cation + free acids | 0.498 | 0.499 | 0.498 | 0.497 | 0.497 |

| | XIII | XIV | XV | XVI |
|---|---|---|---|---|
| Mole ratio of metal cation: anion + cation + free acids | 0.496 | 0.495 | 0.496 | 0.496 |

The mixed seasonings of Example I–XVI are used in the following Example XVII, et seq.:

EXAMPLE XVII

The following ingredients are refluxed for four hours:

| Ingredients | Parts by Weight |
|---|---|
| L-Cysteine hydrochloride | 0.9 |
| Carbohydrate-free vegetable protein hydrolysate | 30.9 |
| Thiamine hydrochloride | 0.9 |
| Water | 67.30 |

The resulting mixture is then aged for three days and an aliquot portion is withdrawn and dried. Based on the weight of the dry solid obtained, sufficient gum arabic is added to the batch to provide a composition containing one part by weight of gum arabic. The composition is then spray-dried.

Ethyl(2-methyl-3-furyl)disulfide is added to the spray-dried material at the rate of 4 ppm.

The resulting material has a beef liver flavor. To this material is added, in separate portions, each of the mixed seasonings of each of Examples I–XVI at levels of 4%, 8%, 12%, 15% and 25%.

Each of the resulting materials has an excellent "rare" beef liver flavor which can be added to "well done" cooked liver in the form of gravies causing the "well done" cooked liver to have a rare flavor nuance.

EXAMPLE XVIII

A beef liver gravy is made by formulating a composition in the amounts indicated:

| Ingredients | Parts by Weight |
|---|---|
| Cornstarch | 10.50 |
| The product of Example VIII | 3.00 |
| Caramel color | 0.30 |
| Garlic powder | 0.05 |
| White pepper | 0.05 |
| Sodium Chloride | 1.90 |
| Monosodium glutamate | 0.20 |

To one unit of gravy flavor concentrate, six ounces of water is added and the mixture is stirred thoroughly to disperse the ingredients, brought to a boil, simmered for one minute, and served. This "meatless" gravy exhibits an excellent rare beef-liver flavor.

EXAMPLE XIX

Seven ppm of ethyl (2-methyl-3-furyl)disulfide is added to beef broth prepared from a commercial dried mixture and 250 ml hot water. To the resulting material is added at a level of 0.1% each of the mixed seasonings of Examples I–XVI. The ethyl(2-methyl-3-furyl)disulfide increases the beef-liver character and imparts a pleasant nutty note. The mixed seasonings cause the overall beef broth to have a "rare liver" nuance. The resultant beef broth has an excellent improved more blended meaty/rare flavor than does the unflavored beef broth.

EXAMPLE XX

The following ground sausage mixture is prepared:

| Ingredient | Parts by Weight |
| --- | --- |
| Ground beef | 200.0 |
| Beef suet | 120.0 |
| Ice/NaCl (50:50 mixture) | 200.0 |
| Potato flour | 100.0 |
| Anhydrous bread crumbs | 140.0 |
| Dry milk powder | 20.0 |
| Standard spice flavor containing: | 10.0 |
| Oil of cumin | 1.6 |
| Oil of mustard | 3.3 |
| Oil of celery | 3.3 |
| Oil of ginger | 5.2 |
| Oil of cloves | 14.3 |
| Oil of coriander | 17.6 |
| Oil of pimenta berries | 22.0 |
| Oil of black pepper | 43.0 |
| Oleoresin capsicum | 373.0 |
| Oil of nutmeg | 500.0 |

To the above mixture 0.02% by weight of the following mixture is added:

| Ingredient | Parts by Weight |
| --- | --- |
| n-Propyl (2-methyl-3-furyl) disulfide | 5.0 |
| Ethyl alcohol (95%) | 95.0 |

To the resulting mixture is added at a level of 100 parts by weight to portions of the resulting mixture are added, separately, each of the mixed seasonings produced according to Examples I-XVI.

The resulting mixtures are then formed into sausages and encased in the usual manner. The encased sausage are heated in water at a temperature of 160°-180° F. for a period of two hours. Each of the sausages has a rare liver-taste reminiscent of the taste of sausage made with natural liver and also containing the rare desirable bloody notes.

EXAMPLE XXI

A mixture of 8.8 grams of cysteine-hydrochloride, 8.8 grams of thiamine hydrochloride and 309.4 grams of carbohydrate-free vegetable protein hydrolysate (Nestle 4BE) is brought to a standard weight of 1000 grams by addition of water and adjusted to a pH of 4.75 with acid or base as required. This mixture is then boiled under reflux conditions at atmospheric pressure for four hours and allowed to cool.

After the mixture is allowed to cool, one gram of isoamyl(2-methyl-3-furyl)disulfide and 0.25 grams of one of the mixed seasonings prepared according to Examples I-XVI is added thereto (separate portions of flavor). The resulting mixture thus obtained has an excellent unique roasted, rare bloody liver meaty flavors with chicken meat nuances.

EXAMPLE XXII

The following ingredients are refluxed for four hours:

| Ingredients | Parts by Weight |
| --- | --- |
| L-Cysteine hydrochloride | 0.9 |
| Carbohydrate-free vegetable protein hydrolysate | 30.9 |
| Thiamine hydrochloride | 0.9 |
| Each of the mixed seasonings of Examples I-XVI | 7.8 |
| Water | 67.30 |

The resulting mixture is then aged for three days and an aliquot portion is withdrawn and dried. Based on the weight of the dry solid obtained, sufficient gum arabic is added to the batch to provide a composition containing one part by weight of gum arabic. The compositon is then spray-dried.

n-Heptyl(2-methyl-3 furyl)disulfide is added to the spray-dried material at the rate of 4 ppm.

The resulting material has an excellent rare roast beef flavor.

EXAMPLE XXIII

A roast beef gravy is made by formulating a composition in the amounts indicated:

| Ingredients | Parts by Weight |
| --- | --- |
| Cornstarch | 10.50 |
| Each of the products of Example XXII, taken separately | 3.00 |
| Caramel color | 0.30 |
| Garlic powder | 0.05 |
| White pepper | 0.05 |
| Salt | 1.92 |
| Monosodium glutamate | 0.20 |

To one unit of gravy flavor concentrate, 0.2 parts by weight of each of the mixed seasonings of Example I-XVI is added and eight ounces of water is added. The mixture is stirred thoroughly to disburse the ingredients, brought to a boil, simmered for one minute, and served. This "meatless" gravy exhibits an excellent rare roast beef flavor.

EXAMPLE XXIV(A)

Cheese Flavor

Skim milk having 22 percent total solids was heated to 145° F. for 30 minutes to substantially destroy any pathogens and to reduce the number of competitive organisms. The skim milk was then cooled to 92° F. and placed in a sterile fermenter having one-fifth of its volume as a head space. The fermenter was maintained at 92° F. The skim milk was inoculated with approximately 3,000 organisms per gram of the medium of the organism *S.lactis*-variation *diacetilactis* (citrate fermenter) and approximately 3,000 organisms per gram of the medium of the organism *S.lactis*-variation *diacetilactis* (citrate non-fermenter). The skim milk was also inoculated with approximately 2,000 organisms per gram of aqueous medium of *B.megatherium* and approximately 2,000 organisms per gram of the medium of *B.megaterium*. The inoculated skim milk was maintained at 92° F. for 5 days during which the organisms therein proliferated.

EXAMPLE XXIV(B)

Production of the Cheese Flavor

Skim milk having 15 percent total solids was heated to 145° F. for 30 minutes to substantially destroy pathogens and to reduce the number of competitive organisms. The skim milk was cooled to 92° F. and placed in a fermenter maintained at 92° F. The skim milk was then inoculated with the product of Example XXIV(A) wherein the resulting inoculated skim milk had a total of approximately 10,000 organisms per gram of skim milk and a ratio of the Bacillus organisms to the Streptococcus organisms was approximately 60/40. The inoculated skim milk was stirred for 35 minutes to disperse the organisms therein. The inoculated skim milk was then sealed in an airtight manner in the fermenter and 1/5 of the volume of the fermenter remained as a head space. Fermentation was carried out at 95° F. for three days. Thereafter, the fermenter was opened under a blanket of nitrogen and cut particles of naturally produced cheddar cheese was placed in the fermentation medium. The amount of cheese added, on a solid basis of the fermentation medium and cheese added, was approximately 33 percent by weight. The fermenter was closed and stirring was carried out until the cheese was suspended. The stirring time was about 1½ hours. Fermentation was then allowed to resume for an additional one day. The mixture of cheese and fermentation produced was pasteurized at 145° F. for 30 minutes and then spray dried in a conventional manner to a fine powder having a complete cheddar cheese taste and taste feel.

EXAMPLE XXIV(C)

On a dry basis was mixed 50 percent solids of Examples XXIV(B) 31.3 percent acid whey powder, 4 percent mixed seasonings (individually of each of the Examples I–XVI 5 percent disodium phosphate (a dispersing agent), 0.5 percent USDA Yellow No. 5, the remainder being dry milk solids. After thorough mixing a portion thereof was dispersed with vigorous stirring in water and spray dried to form a cheese flavored powder. The cheese powder was a fine textured powder having a very distinctive and medium degree of improved natural-like cheddar cheese flavor.

EXAMPLE XXIV(D)

A second portion of the product of Example XXIV(C) was mixed with an equal portion of weight of milk solids and produced a cheddar cheese spread of mild cheese flavor.

EXAMPLE XXIV(E)

A third portion of the product of Example XXIV(C) was mixed with an equal portion of vegetable fats and produced a mild cheddar cheese dip.

EXAMPLE XXIV(F)

Equal portions of the product of Example XXIV(C) and whey solids were mixed to produce a medium to mild cheese flavored powder for sprinkling on salads and the like.

EXAMPLE XXIV(G)

On a dry weight basis, there was mixed 50 percent of the fermented solids of Example XXIV(B), 25 percent acid whey powder, 15 percent butter fat, 0.5 percent Atmos 150, 4 percent of each of the mixed seasonings of Examples I–XVI, 5 percent disodium phosphate and 0.5 percent USDA Yellow No. 5. This product after being thoroughly mixed was cut into wedges and produced an excellent natural like cheddar cheese flavor product.

EXAMPLE XXV

Dry Soup Mix

The following dry soup mixes are prepared:

| Ingredients | Parts by Weight |
| --- | --- |
| Chopped chicken fat | 3.0 |
| Ground chicken meat | 4.0 |
| Separately, the mixed seasonings of each of Example I–XVI | 8.0 |
| Monosodium glutamate | 6.0 |
| Dextrose | 3.0 |
| Onion powder | 0.7 |
| Enxymatically hydrolyzed yeast | 0.5 |
| Turmeric | 0.118 |
| Parsley | 0.04 |
| Sage | 0.01 |
| Noodles | 32.0 |

Each of the mixtures are then simmered in 800 cc. of water for 7 minutes, and soups having a seasoned chicken flavor results and even more improved chicken flavor results when chicken fat employed is first mixed with 0.18 cc. of ethanol containing 10% by weight of arachidonic acid.

EXAMPLE XXVI

Two chicken flavors are prepared by refluxing the following ingredients at about 95° C. for 2 hours:

| Ingredients | A | B | |
| --- | --- | --- | --- |
| Corn gluten hydrolysate | 37.92 | 45.17 | parts |
| Xylose | 0.19 | 0.5 | |
| Thiamine HCl | 1.14 | 1.5 | |
| Nucleotides* | 0.75 | — | |
| The mixed seasoning of Example IV | 0.35 | 0.42 | |
| Water | 60.00 | 52.00 | |

*50/50 mixture of sodium inosinate and sodium guanylate.

After drying, 16.31 parts of autolysed yeast extract are added to formula A. The product of formula B is dry blended with 19.43 parts of autolysed yeast and 0.83 parts of nucleotides. Both products have a very pleasant seasoned chicken flavor.

EXAMPLE XXVII

Bologna Sausage

Beef and pork were separately treated and left to stand for 2 days to be impregnated with each of the mixed seasonings of Examples I–XVI, and potassium nitrate added thereto. Then, they were removed and ground by separate meat choppers. Lean meat from each ground meat wasput together and treated by a cutter. To the mixed meat being cut, 5'-guanylic acid was added in the form of the calcium salt in one sample lot and the disodium salt in the other sample lot, in an amount corresponding, as 5'-guanylic acid, to 70 mgs. percent based on the total weight of the meat used. Then, the resultant meat paste, after addition therto of fat was forced into a tubular case with the aid of a stuffer. The case was bound at intervals of 25 cms. Finally, the case was dried at 40° C. for 1 hour, smoked at 65° C. for 3 hours, heated in water at 75° C. for 1.5 hours, and cooled to provide a Bologna sausage. The residual ratio of 5'-guanylic acid in the product incorporating its calcium salt was found to be 60% as compared with 32% in the product incorporationg its disodium salt. The resulting Bologna sausage had excellent seasoned meat flavor highly superior to Bologna sausages known in the prior art.

EXAMPLE XXVIII(A)

To 6.4 grams of 4-hydroxy-2,5-dimethyl-2,3-dihydrofuran-3-one in a buffer solution containing about 35 grams sodium acetate, about 14 grams of acetic acid and 400 ml of water (pH 5.0), a solution of 12 grams of sodium sulphide (Na$_2$S.9H$_2$O) in 200 ml of water was added over a period of 30 minutes. The mixture was then boiled under reflux conditions at atmospheric pressure for 2 hours and allowed to cool. The pH was then 6.6.

EXAMPLE XXVIII(B)

A gravy was prepared from the following ingredients:

| Ingredients | Grams |
| --- | --- |
| Potato starch | 15.0 |
| Onion powder | 2.5 |
| Monosodium glutamate | 3.0 |
| Beef tallow | 20.0 |
| Flour | 15.0 |
| Caramel | 1.6 |
| Pepper | 0.02 |
| Bayleaves | 0.02 |
| Clove | 0.02 |
| Each of the mixed seasonings of Examples I–XVI taken separately | 8.0 |
| Protein hydrolysate | 4.0 |
| Beef extract powder | 2.0 |
| Tomato powder | 1.0 |
| | 72.16 |

The potato starch and flour were added to the molten beef tallow at 60° C. under continuous stirring. The other ingredients were well blended and likewise added to the beef tallow. The whole mixture was boiled in 1 liter of water.

The gravy so obtained was divided into two portions of 500 ml. In the first portion 250 mg of malto-dextrin was dissolved; in the second portion 250 mg of the flavour prepared according to Example XXVIII(A). Both gravies were assessed in a paired comparison test by a panel consisting of 12 persons.

The gravy containing the flavour of Example XXVII(A) was preferred by 10 out of the 12 tasters because of its more pronounced fried-meat flavour with an excellent bloody note.

EXAMPLE XXIX

The following ingredients were introduced into a cooking vessel and heated to popping temperature:

| Ingredient | |
| --- | --- |
| Encapsulated Bleu Cheese Flavor | 3.6 grams |
| Soybean Oil | 55 cc's |
| Popcorn | 80.0 grams |

-continued

| Ingredient | |
| --- | --- |
| The mixed seasoning of Example III | 4.0 grams |

The resulting popcorn had a decided blue cheese flavor which was excellently seasoned which was uniformly distributed and did not lose potency of the flavor or the seasoning after several days.

A method of production is set forth in detail in U.S. Pat. No. 4,096,281 issued on June 20, 1978 the disclosure of which is incorporated by reference herein.

What is claimed is:

1. A process for enhancing the taste of a meat-flavored foodstuff comprising the step of adding to said foodstuff a taste enhancing quantity of a mixed seasoning composition of matter consisting essentially of:

(a) from about 0.25 up to about 0.80 mole percent on a dry basis of a lactic acid/lactate species mixture having the structure:

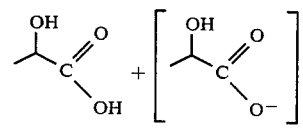

(b) from 0 up to about 0.09 mole percent on a dry basis of glycollic acid/glycollate ion species mixture having the structure:

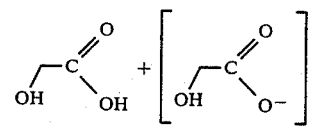

(c) from 0 up to about 10.0 mole percent on a dry basis of magnesium ion;

(d) from about 6 mole percent up to about 50 mole percent on a dry basis of a phosphate/monoacid phosphate/diacid phosphate/phosphoric acid species mixture having the formula:

taken alone or taken further together with at least one of the species tripolyphosphate, pyrophosphate and/or polymetaphosphate;

(e) from 0 mole percent up to about 40 mole percent on a dry basis of sodium ion;

(f) from about 8 mole percent up to about 50 mole percent on a dry basis of potassium ion;

(g) from about 0.3 mole percent up to about 16 mole percent on a dry basis of chloride ion;

(h) from 0 mole percent up to 30 mole percent on a dry basis of carbonate/bicarbonate/carbonic acid species mixture having the formula:

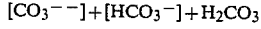

(j) from 0 mole percent up to about 2.0 mole percent on a dry basis of monobasic glutamate/dibasic glutamate/glutamic acid species mixture having the formulae:

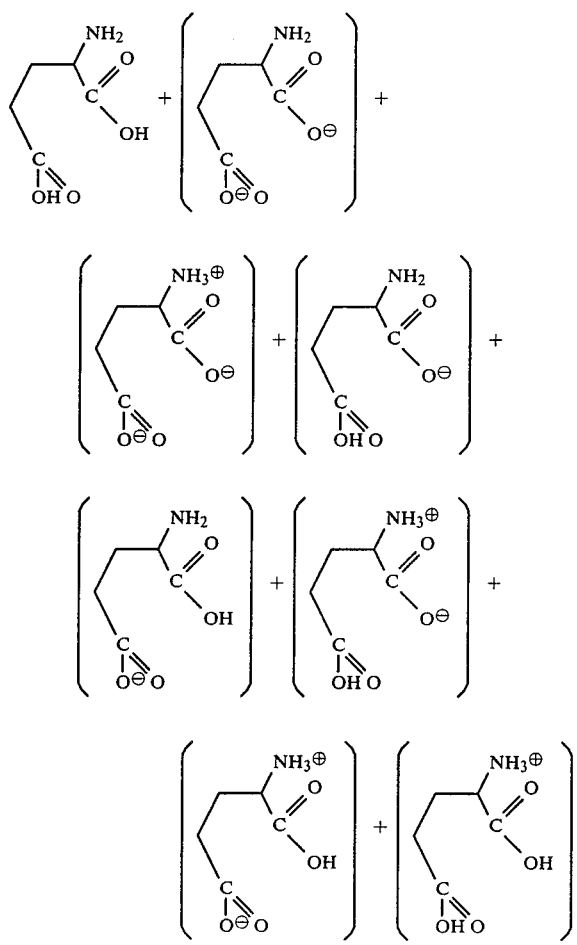

(k) from 0 up to about 0.6 mole percent on a dry basis of calcium ion;

with the proviso that the sum total of mole percent on a dry basis of sodium ion, potassium ion, magnesium ion and calcium ion is from about 48 mole percent up to about 60 mole percent; and with the proviso that the sum total of carbonate/bicarbonate/carbonic acid ion species mixture having the formula:

[CO$_3{}^{--}$]+[HCO$_3{}^{-}$]+H$_2$CO$_3$ taken together with the sum total mole percent on a dry basis of the phosphate/monobasic phosphate/dibasic phosphate species mixture having the formula:

[PO$_4{}^{---}$]+[HPO$_4{}^{--}$]+[H$_2$PO$_4{}^{-}$]+H$_3$PO$_4$ taken alone or taken further together with at least one of the species tripolyphosphate, pyrophosphate and/or polymetaphosphate is from about 34 mole percent up to about 50 mole percent; the term "mole percent" being based upon the total moles of cations, anions and free organic acid which is substantially non-ionized in the composition and with the additional proviso that the sum total of:

(i) magnesium ion;
(ii) monobasic glutamate/dibasic glutamate/glutamic acid species mixture; and
(iii) calcium ion is greater than 0, is of a finite amount and is functionally effective.

2. The process of claim 1 wherein the mixed seasoning composition of matter consists essentially of a mixture of (i) from about 60 weight percent up to about 96 weight percent on a dry basis of a substance selected from the group consisting of (a) KH$_2$PO$_4$; (b) K$_2$HPO$_4$; and (c) a mixture of Mg$_3$(PO$_4$)$_2$.4H$_2$O and K$_2$CO$_3$; (ii) from about 0.4 up to about 3.5 weight percent on a dry basis of lactic acid; (iii) from about 0.4 up to about 17.0 weight percent on a dry basis of a compound selected from the group consisting of sodium chloride, potassium and calcium chloride; and (iv) from about 1.75 up to about 3.25 weight percent on a dry basis of a glutamate salt selected from the group consisting of monosodium glutamate and monopotassium glutamate.

3. The process of claim 2 wherein the mixed seasoning composition of matter also contains in addition (v) from about 4.0 weight percent up to about 25.0 weight percent of a compound selected from the group consisting of MgCO$_3$, KHCO$_3$ and NaHCO$_3$.

4. The process of claim 1 wherein the mixed seasoning composition of matter also contains in addition a composition of matter selected from the group consisting of L-cysteine and L-cysteine hydrochloride.

5. The process of claim 1 wherein the mixed seasoning composition of matter contains in addition a composition of matter selected from the group consisting of ribotides and alkali metal inosinates.

6. The process of claim 1 where there is added in addition to the mixed seaoning, beef extract.

7. The process of claim 1 wherein there is added in addition to the mixed seasoning, hydrolyzed vegetable protein.

8. The process of claim 1 wherein there is added in addition to the mixed seasoning, a composition of matter selected from the group consisting of heat reaction products of cysteine or L-cysteine hydrochloride, thiamine and hydrolyzed vegetable protein and a heat reaction product of cysteine or L-cysteine hydrochloride and thiamine.

9. The process of claim 1 wherein there is added in addition to the mixed seasoning, a composition of matter selected from the group consisting of a heat reaction product of a sulfur containing compound which contains a sulfhydryl group and a five membered or six membered cyclic keto ether which is a cyclic keto furanone or a cyclic keto pyranone.

10. The process of claim 1 wherein there is added in addition to the mixed seasoning, a sulfur containing compound having a furyl moiety substituted at the "3" position thereof with a thio moiety.

* * * * *